(12) United States Patent
Martin et al.

(10) Patent No.: US 9,308,476 B2
(45) Date of Patent: Apr. 12, 2016

(54) FILTER WITH LOCALIZED FLOW ATTACHMENT AND FILTER HEAD

(75) Inventors: Harold R. Martin, Cookeville, TN (US); Rahul Kallurwar, Cookeville, TN (US); James L. Eickhoff, Cookeville, MN (US); Ismail C. Bagci, Cookeville, TN (US); Jeffrey A. Husband, Huntsville, AL (US); Aaron M. Wells, Cookeville, TN (US); Kevin C. South, Cookeville, TN (US)

(73) Assignee: CUMMINS FILTRATION IP, INC., Columbus, IN (US)

(*) Notice: Subject to any disclaimer, the term of this patent is extended or adjusted under 35 U.S.C. 154(b) by 544 days.

(21) Appl. No.: 12/763,581

(22) Filed: Apr. 20, 2010

(65) Prior Publication Data

US 2010/0200490 A1 Aug. 12, 2010

Related U.S. Application Data

(63) Continuation-in-part of application No. 11/777,861, filed on Jul. 13, 2007.

(51) Int. Cl.
*B01D 35/30* (2006.01)
*B01D 29/11* (2006.01)
*A47J 43/22* (2006.01)

(52) U.S. Cl.
CPC .............. *B01D 35/30* (2013.01); *B01D 29/114* (2013.01); *B01D 2201/302* (2013.01); *B01D 2201/34* (2013.01)

(58) Field of Classification Search
CPC ................. B01D 2201/4023; B01D 2201/305; B01D 2201/4084; B01D 2201/0415; B01D 21/24; B01D 23/28; B01D 24/38; B01D 25/30; B01D 27/00; B01D 27/005; B01D 27/08; A47J 43/22; A61M 5/165

USPC .................................................. 210/232, 443
See application file for complete search history.

(56) References Cited

U.S. PATENT DOCUMENTS

| | | | |
|---|---|---|---|
| 4,645,601 A * | 2/1987 | Regunathan et al. | 210/321.83 |
| 4,735,716 A | 4/1988 | Petrucci et al. | |
| 4,806,240 A * | 2/1989 | Giordano et al. | 210/232 |
| 4,877,521 A | 10/1989 | Petrucci et al. | |
| 4,948,505 A | 8/1990 | Petrucci et al. | |
| 5,549,821 A * | 8/1996 | Bounnakhom et al. | 210/232 |
| 5,591,332 A | 1/1997 | Reid et al. | |
| 5,653,871 A | 8/1997 | Thomsen | |
| 6,101,996 A * | 8/2000 | Arita et al. | 123/196 A |
| 6,120,685 A | 9/2000 | Carlson et al. | |
| 6,195,982 B1* | 3/2001 | Gysling et al. | 60/204 |
| 6,488,845 B1* | 12/2002 | Neufeld et al. | 210/232 |
| 6,533,931 B1* | 3/2003 | Reid | 210/232 |
| 6,948,471 B1* | 9/2005 | Odashima | 123/196 R |
| 7,166,215 B2 | 1/2007 | Reid | |
| 2003/0042192 A1 | 3/2003 | Nam et al. | |
| 2003/0070723 A1* | 4/2003 | Kilgore | 141/1 |
| 2012/0144854 A1* | 6/2012 | Huda et al. | 62/318 |

* cited by examiner

*Primary Examiner* — Dirk Bass
*Assistant Examiner* — Hayden Brewster
(74) *Attorney, Agent, or Firm* — Foley & Lardner LLP

(57) ABSTRACT

A fluid filter device is described, where a flow attachment member provides a unique interface between the filtering element and a filter head. The fluid filter described herein generally provides a flow structure that is localized and sealed. The flow attachment member is configured to communicate fluid into and out of the fluid filter, and is configured to localize fluid flow both into and out of the fluid filter within a separating structure of the flow attachment member. The flow attachment member further includes a seal structure configured to substantially prevent or at least confine leakage to a localized area away from proximity of the edges of the housing. A composite filter head is described that has integrally molded inlet and outlet fittings.

25 Claims, 35 Drawing Sheets

FILTER WITH LOCALIZED FLOW ATTACHMENT AND FILTER HEAD

This application is a Continuation-In-Part of copending application Ser. No. 11/777,861, filed Jul. 13, 2007, and which is herewith incorporated by reference in its entirety.

FIELD

A fluid filter is disclosed having a flow attachment that localizes fluid flow into and out of the fluid filter within a separating structure of the flow attachment. A composite filter head that connects with the flow attachment is also described.

BACKGROUND

Fluid filters are widely known and used in a variety of systems requiring filtration of a working fluid. After use and wear, many fluid filters eventually must have their filter elements serviced and/or replaced, and many fluid filters themselves must be removed in order to be serviced and/or replaced. Thus, ease and cleanliness of service have been concerns in fluid filter design. Preventing leakage or at least confining leakage has presented challenges in the sealing structure of such fluid filters. In one example shown in FIG. 25, a typical spin-on filter 900 includes a metallic nutplate 914 that typically is employed for allowing unfiltered fluid to flow into opening 922. The unfiltered fluid filters through a filter media 910, and the filtered fluid flows out of opening 920. Such filters generally require a large seal 916 around the outer edge of the housing 912 and between the housing 912 and nutplate 914. An additional seal 918 is further required around the attaching spud and between the spud and the nutplate.

While previous designs have been useful, improvements and modifications can still be made in fluid filter design, for example, at the filter head and attachment interface.

SUMMARY

The following technical disclosure describes an improved fluid filter and filter head. The fluid filter described herein includes a housing having a filter media disposed therein. A flow attachment member is configured to communicate fluid to be filtered to the filter media, and is configured to communicate fluid filtered by the filter media out of the fluid filter. The flow attachment member includes a structure that is configured to localize fluid flow both into and out of the fluid filter, and includes a seal structure to substantially prevent or at least confine leakage.

A filter head that connects with the flow attachment has inlet and outlet fittings integrally formed, constructed, or otherwise built into the overall design, such as for example being integrally molded into an overall composite filter head design. The filter head has an inner configuration that maintains structural integrity while reducing the filter head weight, and has an outer configuration that improves fluid flow and cleanliness, for example by minimizing leakage.

Some benefits of such a fluid filter can include allowing for a more clean service, since flow into and out of the fluid filter is localized within the flow attachment member. As a result, a filter can be provided that is more environment friendly and is more pleasing to customers and users. The fluid filter described herein also can substantially prevent or at least confine leakage to a localized area and away from proximity of edges of the housing, since a seal structure is provided on the flow attachment member. Thus, additional external and internal seals can be eliminated, where a fluid filter can be provided that is relatively inexpensive, reliable, and has fewer parts. Further, the flow attachment can eliminate the need for a nutplate as employed in many fluid filters, such as in spin-on type fluid filters. The flow attachment can provide a unique head and filter interface that may give OEM improved aftermarket business.

Even further, the flow attachment member can provide a benefit of pre-filling a fluid filter in the unfiltered containment region, such as the "dirty side." For example, traditional fuel filters are pre-filled before installation in the clean compartment region (or "clean side"). In such flow configurations, the pre-filled fluid is already on the clean side and is allowed to enter the fuel system at first. Such pre-filling can be detrimental to newer high-pressure common rail fuel systems that require fine particle filtration. The flow attachment member disclosed herein can utilize a flow redirection concept through the flow attachment member that effectively diverts pre-filled fluid through the filtration media before it can enter the fuel system. That is, the flow attachment member described herein allows for a pre-filtering function of the pre-filled fluid before the fluid is allowed to enter exit the fluid filter.

In one embodiment, a fluid filter includes a housing and filter media disposed within the housing. An endplate is disposed at one end of the filter media. The filter media is configured to allow fluid to be filtered through the filter media from one side to another side. A flow attachment member is disposed at an end opposite the end that the endplate is disposed. The flow attachment member is configured to communicate fluid to be filtered to the filter media, and is configured to communicate fluid filtered by the filter media out of the fluid filter. The flow attachment member is configured to localize fluid flowing both into and out of the fluid filter within a separating structure of the flow attachment member. The flow attachment member includes a seal structure disposed on an outer surface of the separating structure.

In one embodiment, the housing is generally open at one end and closed at an opposite end. The open end is configured to receive the filter media, and is engaged with the flow attachment member in a fluid tight seal. The flow attachment member is engaged with the filter media in a fluid tight seal to maintain separated fluid flow.

In one embodiment, the separating structure of the flow attachment member is disposed generally proximate a center region of the fluid filter and generally away from proximity of an outer edge of the housing. In yet another embodiment, the flow attachment member is a stem that houses the separating structure, the stein extends away from the filter media and outwardly from the open end of the housing. In one embodiment, the stem is generally disposed at a center region of the open end, where fluid flow into and out of the fluid filter is concentrated proximate the center.

In yet another embodiment, the flow attachment member is a separate adapter structure, which can also be connected to a head of an already existing fluid filter. As one example, the flow attachment member can be configured as an adapter for use with traditional spin-on filters. Such a flow attachment member would connect to and seal the separate flow openings of the existing filter's nutplate. More specifically, the flow attachment member would direct unfiltered fluid and filtered fluid through its separating structure. In such a configuration, fluid flow can be re-routed through the flow attachment member, while allowing usual flow within a standard style filter (e.g. spin-on filter).

In one embodiment, the seal structure on the separating structure includes at least one sealing member axially disposed on the outer surface of the separating structure. In one example, the sealing member is an o-ring. In yet another embodiment, the sealing structure includes a plurality of sealing members, where the sealing members may be o-rings. In some examples, the seal structure can include but is not limited to one of two resilient o-rings, a combination of a resilient o-ring and face seal having a gasket member, or two face seals each having a gasket member.

In yet another embodiment, the fluid filter is fully disposable.

DETAILED DESCRIPTION

Figure 1:
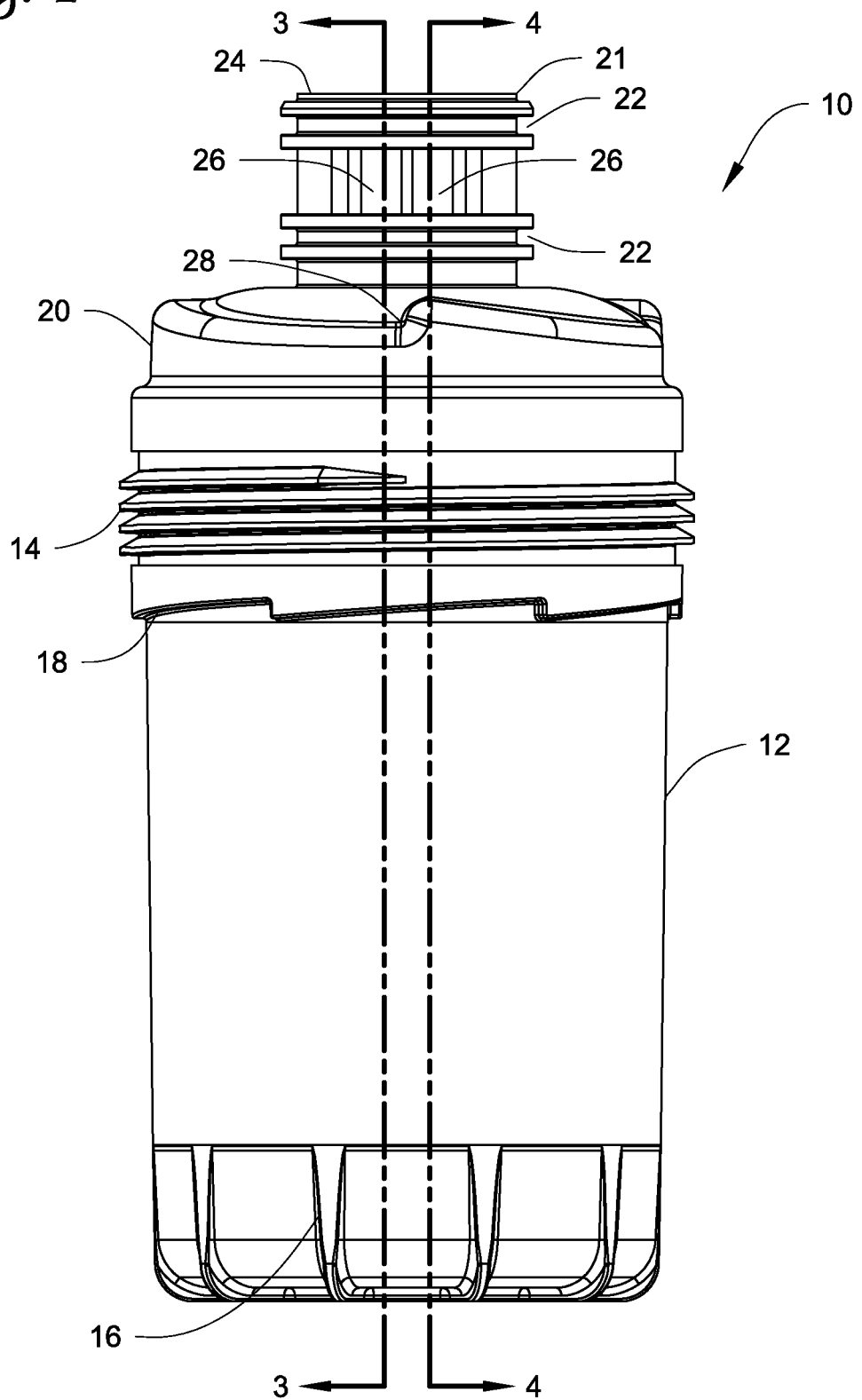
FIG. 1 illustrates a side view of one embodiment of a fluid filter.
Figure 2:
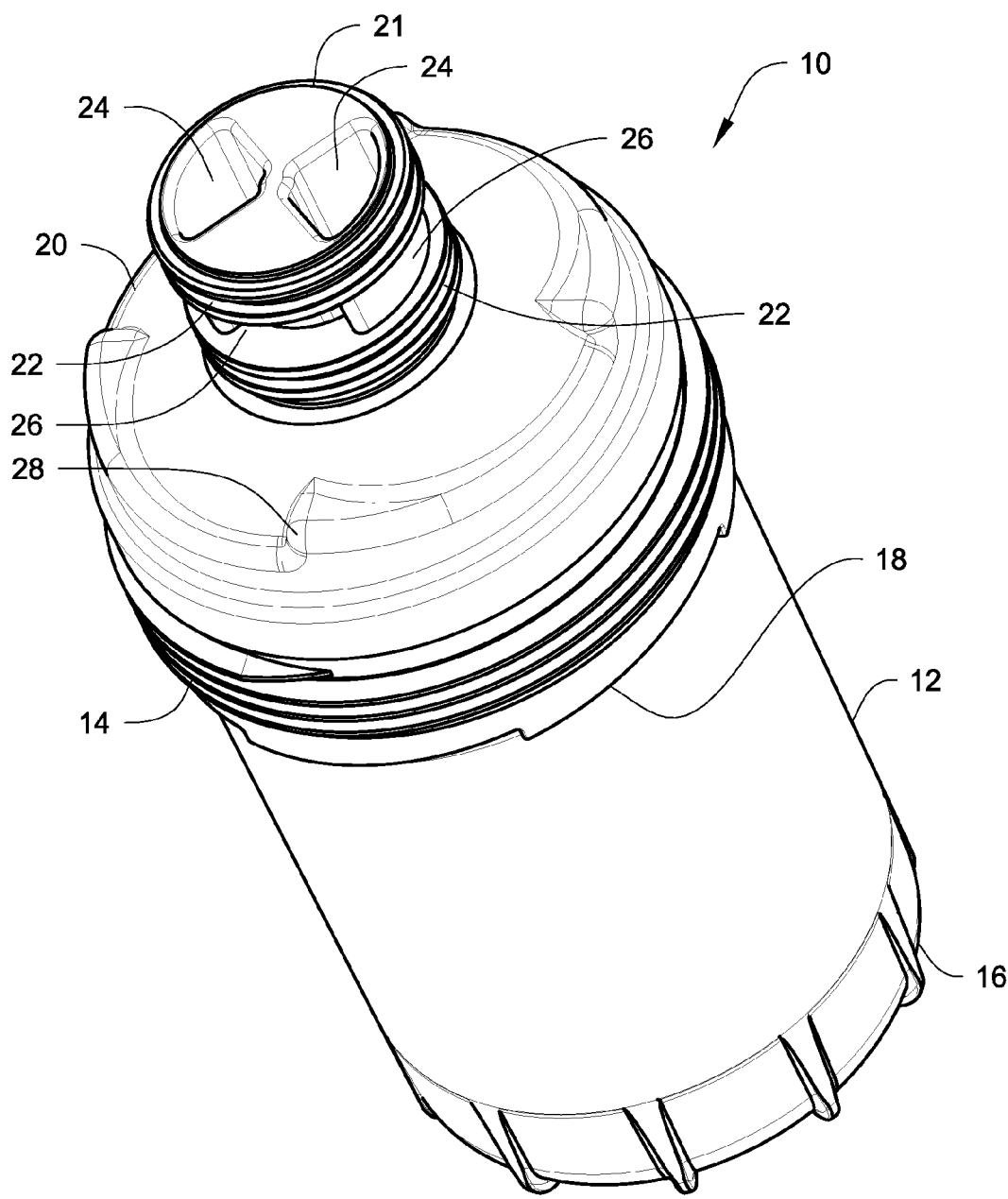
FIG. 2 illustrates an end perspective view of the fluid filter of FIG. 1.

The fluid filter described herein generally provides a flow structure that is localized and sealed. For example, the fluid filter described herein includes a flow attachment member configured to communicate fluid to be filtered by a filter media into the fluid filter, and configured to communicate fluid filtered by the filter media out of the fluid filter. The flow attachment member is configured to localize fluid flow both into and out of the fluid filter within a flow structure of the flow attachment member. The flow attachment member further includes a seal structure disposed on an outer surface of the structure of the flow attachment member. The fluid filter described herein can allow for cleaner servicing of the fluid filter, and can allow for a pre-filtering function, since flow into and out of the fluid filter is localized within particular flow paths created by the flow attachment member. The fluid filter described also can substantially prevent or at least confine leakage to a localized area away from proximity of the edges of the housing, as the sealing structure seals the localized flow within the flow attachment member.

It will be appreciated that "fluid to be filtered" is meant as any working fluid requiring filtration in a process or system, such as but not limited to fuel, oil, coolant, or the like. Also, a fluid filter as described herein can be useful in a variety of filter systems, such as but not limited to, oil and lube filtration and fuel filtration systems. As some examples only, the fluid filter described is particularly useful in fuel and lube filtration systems.

FIGS. 1-4 illustrate one embodiment of a fluid filter 10. The fluid filter 10 includes a housing 12. The housing 12 generally is a cylindrical container or shell. The housing 12 includes an end with a plurality of supporting members 16. The supporting members 16 protrude outward from the housing 12, and are radially disposed proximately to and about the end. In one embodiment, the supporting members 16 generally resemble rib-like portions. The housing 12 also includes an external attachment feature 14 disposed proximate an opposite end that the supporting members 16 are disposed. As some examples, the external attachment feature 14 may be constructed as a threaded configuration, bayonet, or the like. It will be appreciated that the supporting members 16 and the external attachment feature 14 are not limited to the specific structure shown, and may be modified using various structures as may be suitable and/or necessary.

A flow attachment member 20 is disposed at an end that is opposite the supporting members 16. The flow attachment member 20 connects to the housing 12 distal to the external attachment feature 14. In one embodiment, the flow attachment member 20 resembles a lid, cap, or cover-like structure having a stem 21 extending outwardly and distally relative to the end of the housing 12. The stem 21 includes an inlet 24 so that fluid to be filtered can enter the housing 12 and so that fluid can access a flow path to the filter media 30. See arrows in FIG. 3. The stem 21 also includes an outlet 26 so that fluid that has been filtered by the filter media 30 can exit the housing 12. See arrows in FIG. 4. As shown, the inlet 24 and outlet 26 are confined within the stem 21 of the flow attachment member 20, where a separating structure or flow separator 25 maintains flow through the inlet 24 and outlet 26 separate from each other.

Grooves 22 are disposed about an outer surface of the stem 21. As shown, the grooves 22 are disposed circumferentially around the stem 21. In one embodiment, the grooves 22 are configured as part of a sealing structure that can hold sealing members (not shown here, but shown in embodiments of FIGS. 11-16). The sealing members may be various structures, such as but not limited to resilient o-ring seals. It will be appreciated that the sealing structure may be accomplished in a variety of ways as one of skill in the art can construct, and may include examples such as but not limited to the o-ring seals described, various gasket configurations, and an interference-type fit. As shown, the grooves 22 provide for a sealing structure such as a dual o-ring seal. It will be appreciated that one o-ring seal or more than two o-ring seals may be employed as desired and/or necessary. It further will be appreciated that o-ring seals may not be used, or may be used in combination with other sealing structures, such as but not limited to gasket seals or interference fit seals.

As with other fluid filters described herein, the stem 21 is configured to provide a unique interface between the filtering element and a filter head. Such a unique interface would have a radially fluid tight seal at the stem 21, where flow into and out of the fluid filter 10 is localized by flow paths of the flow attachment member 20, and which are accessed through the inlet 24 and outlet 26 and confined within the stem 21. As shown, the stem 21 is relatively disposed proximate, or substantially at a center region, and generally at the open end of the housing 12. The stem 21 is shown disposed away from proximity of the perimeter wall edges of the housing 12. As one example, the stem 21 substantially is disposed about a longitudinally centered axis of the overall fluid filter 10.

The housing 12 and flow attachment member 20 are connected in a fluid tight seal at their outer walls. In one embodiment, the housing 12 and the flow attachment member 20 are connected via a spin weld configuration. As shown, the housing 12 includes grips 18 and the flow attachment member 20 includes grips 28. In one example, the grips 18, 28 are used to connect the housing 12 and the flow attachment member 20 through a spin-welding process. Grips 18 are disposed about an outer surface of the housing 12, while grips 28 are disposed on an outer surface of the flow attachment member 20 and radially outward from the stem 21. In one embodiment, the grips 18, 28 generally resemble sawtooth grips. It will be appreciated that that the grips are not limited to the specific structure shown, and may be modified as suitable and/or necessary. It will further be appreciated that the housing 12 and flow attachment member 20 may not be connected via spin-welding, but by some other approach, so long as the fluid tight seal is achieved between the housing 12 and flow attachment member 20.

Turning to the filter media 30, the filter media 30 is disposed within the housing 12. The filter media 30 is connected to an endplate 32 disposed proximate the end where the support members 16 are disposed. The filter media 30 is configured to connect with the flow attachment member 20 in a fluid tight seal through another endplate 34. The filter media 30 is connected with another endplate 34. As shown, the filter media 30 is disposed between endplates 32, 34. The endplate 34 is disposed at an opposite end from the endplate 32, where the endplate 34 can sealingly engage with the flow attachment member 20 in a fluid tight seal.

In one embodiment, the flow attachment member 20 and the endplate 34 are connected by a press fit. As one example, the flow separator 25 includes an outer annular surface that sealingly engages with an annular surface and shoulder of the endplate 34. In such a configuration, the filter media 30 is connected to the flow attachment member 20 through a sealing engagement between the endplate 34 and the flow separator 25. In one embodiment, the filter media 30, the endplates 32, 34, and a center tube 36 (described in further detail below) together provide a cartridge assembly that is connected with the flow attachment member 20 in a fluid tight seal. It will be appreciated that the engagement between the endplate 34 and the flow attachment member 20 is not limited to the specific structure shown or to a press fit technique. Various configurations may be employed for attaching the filter media 30 to the flow attachment member 20 as desired and/or necessary, so long as the fluid tight seal is accomplished.

Figure 3:
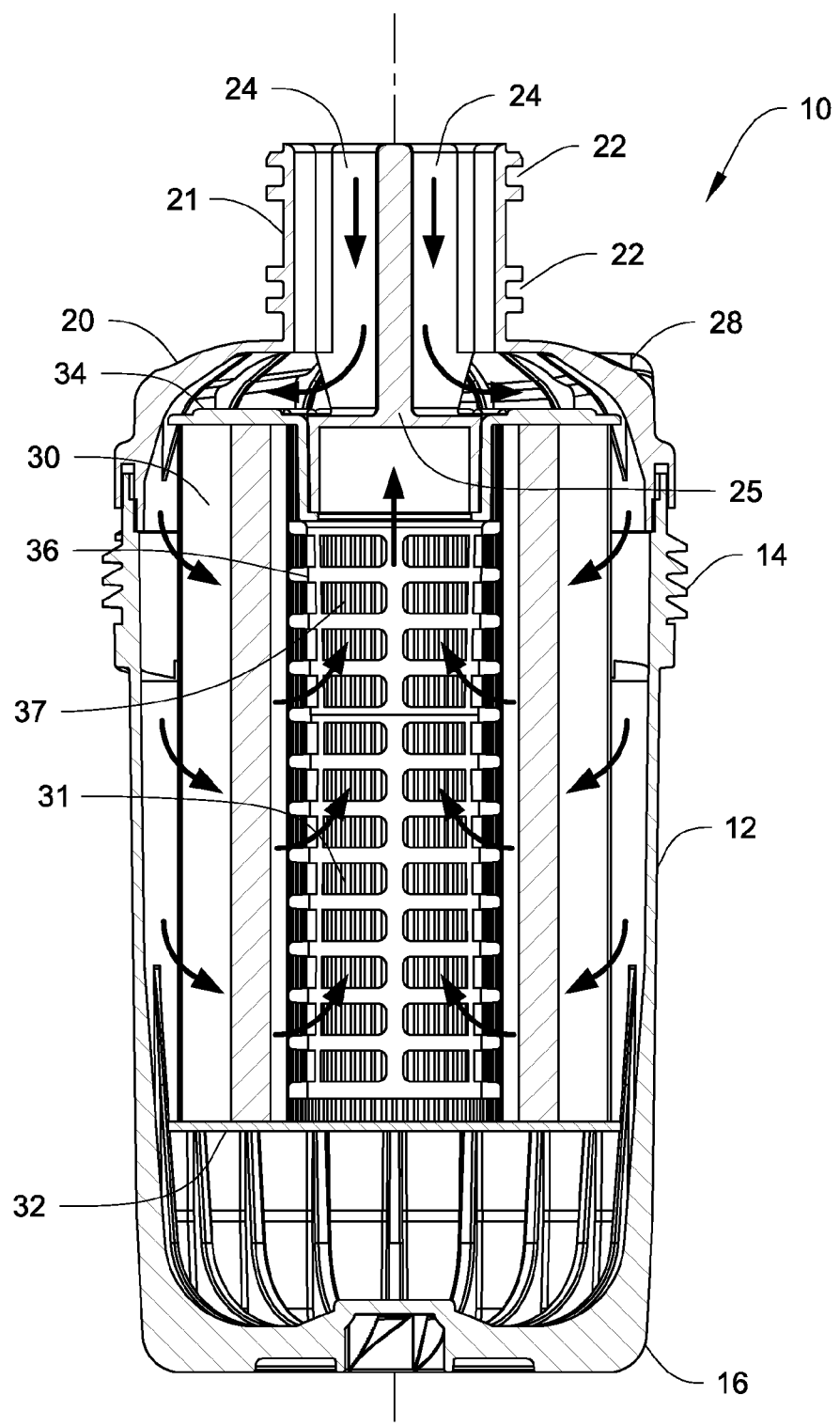
FIG. 3 illustrates a side sectional view of the fluid filter taken from line 3-3 of FIG. 1.

The filter media 30 may be constructed in various configurations, such as but not limited to a spiral wrap, pleated, insert molded, stack disc, or flow through configurations, combinations of these, or the like. As shown in FIG. 3, the filter media 30 has a pleated configuration having folds 31. It will be appreciated that the material used for constructing the filter media 30 is not limited, so long as the filter media 30 will provide the desired filtering effect for its particular application.

Figure 4:
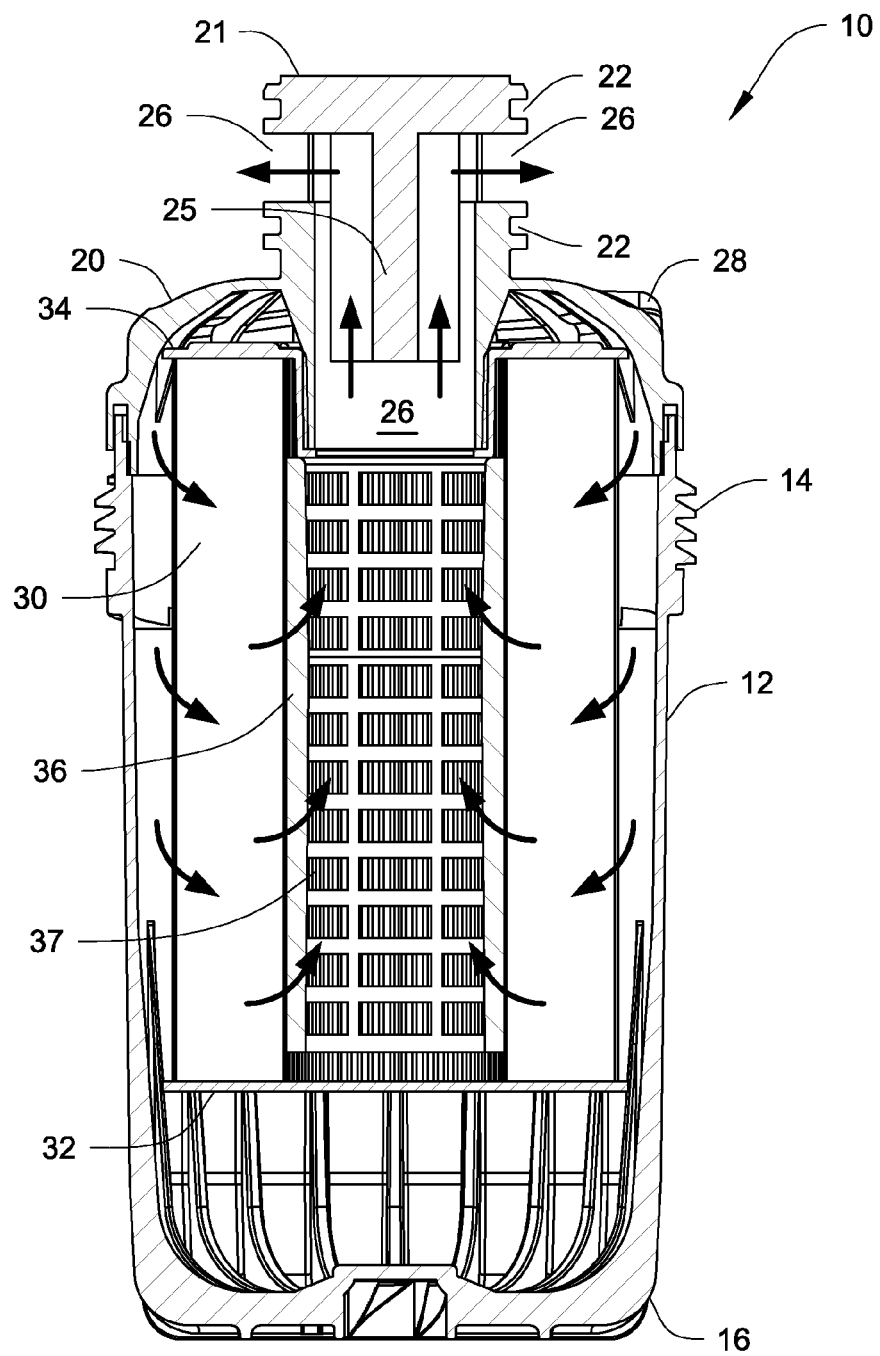
FIG. 4 illustrates a side sectional view of the fluid filter taken from line 4-4 of FIG. 1.
Figure 5:
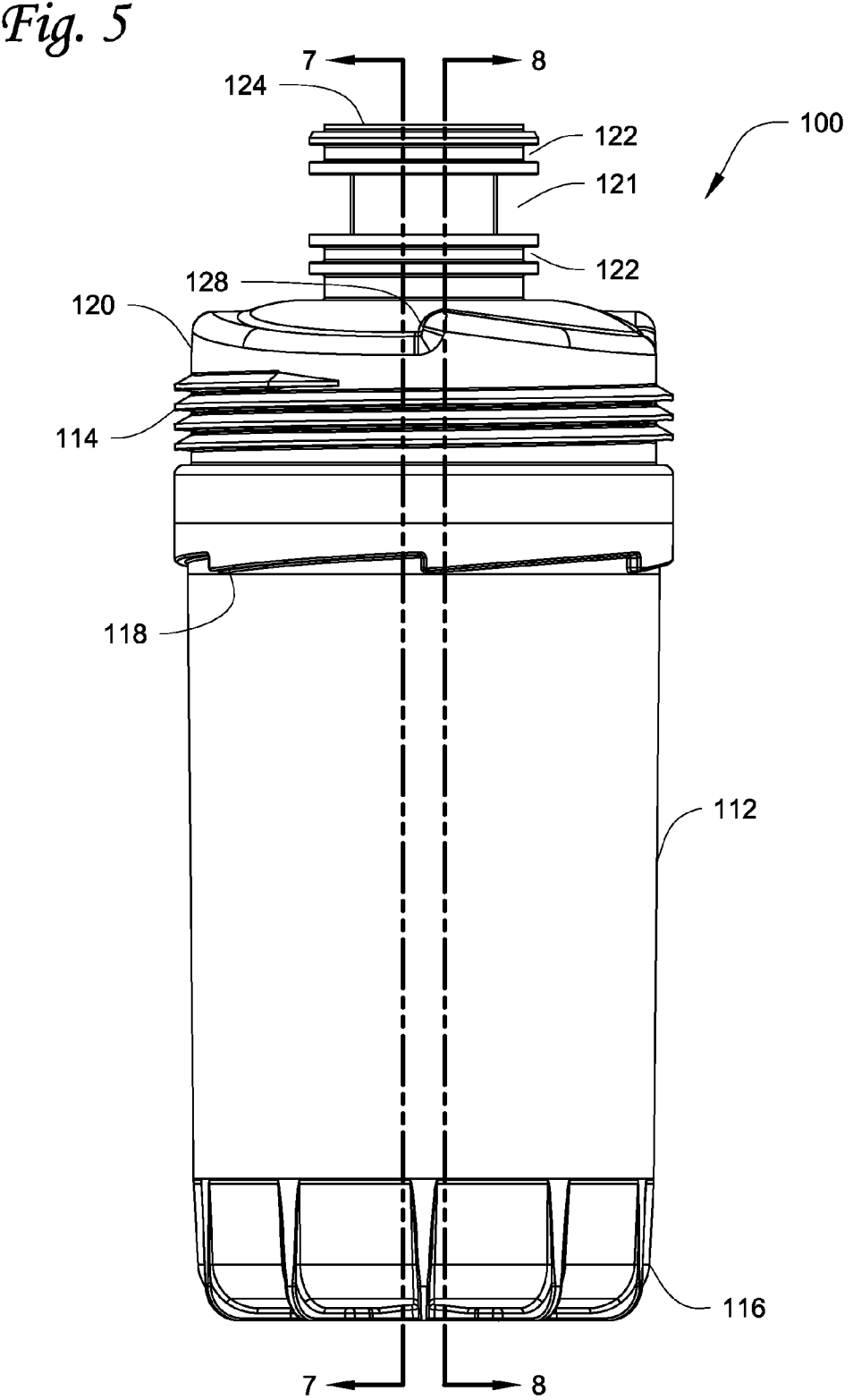
FIG. 5 illustrates a side view of another embodiment of a fluid filter.
Figure 6:
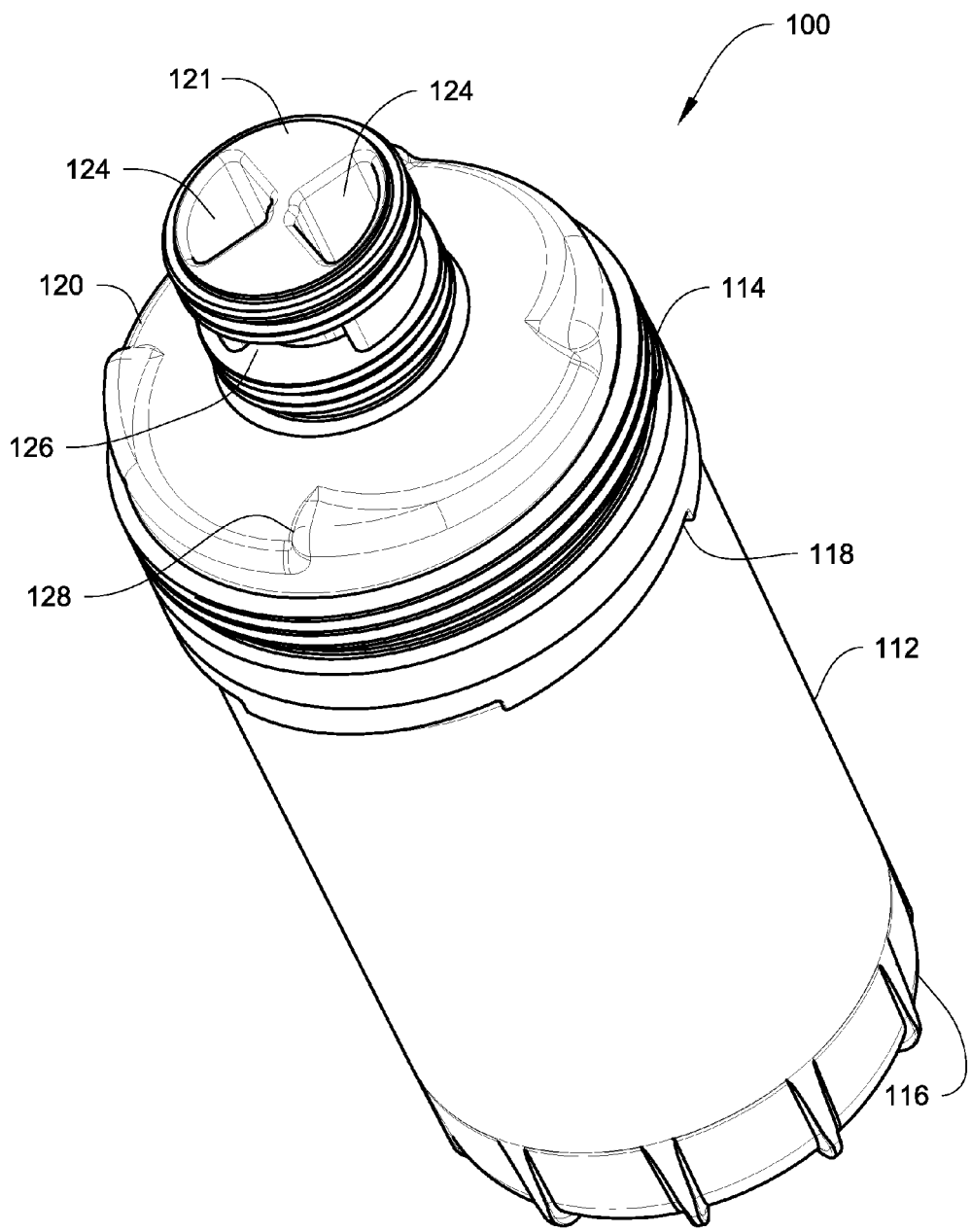
FIG. 6 illustrates an end perspective view of the fluid filter of FIG. 5.

In FIGS. 3 and 4, fluid flowing through the fluid filter 10 enters inlet 24 (see FIG. 3) and exits outlet 26 (see FIG. 4). As described, the stem 21 contains both the inlet 24 and outlet 26, where a flow separator 25 maintains the separate flow into and out of the fluid filter 10 (best shown in embodiment of FIGS. 9 and 10 for flow separator 125).

Fluid enters the housing 12 from the inlet 24 and travels to an outer side of the filter media 30 and to a space between the filter media 30 and the inner wall of the housing 12. Fluid can then be filtered through the filter media 30 to its inner side. A center tube 36 is disposed within the filter media 30. In one example, the center tube 36 cooperates with the filter media 30 in a concentric configuration, where a plurality of openings 37 allow for fluid filtered by the filter media 30 to enter the center tube 36 and exit through the outlet 26. See arrows in the housing 12, filter media 30, and center tube 36. As with the filter media 30, the center tube 36 is disposed between the endplates 32, 34, and can provide further structural support for the filter media 30.

The flow configuration of FIGS. 1-4 provide a generally radial fluid flow at first, where fluid entering the inlet 24 is directed radially outward to a position between the filter media 30 and housing 12. As described, the flow attachment member 20, its stem 21, and the seal structure provide a separated incoming and outgoing fluid flow that is localized away from edges of the housing. In such a configuration, an external seal often employed in spin-on filters between a nutplate and housing can be eliminated. Further, a nutplate in such designs may also be eliminated. See for example FIG. 25.

FIGS. 5-10 illustrate another embodiment of a fluid filter 100. The fluid filter 100 is similar to the fluid filter 10, except that fluid filter 100 includes an external attachment feature 114 disposed on an outer cylindrical surface of the flow attachment member 120, rather than on the housing 112.

The housing 112 generally is a cylindrical container or shell and includes an end with a plurality of supporting members 116. The supporting members 116 protrude outward from the housing 112, and are radially disposed proximately to and about the end. In one embodiment, the supporting members 116 generally resemble rib-like portions. The housing 112 also includes an external attachment feature 114 disposed proximate an opposite end that the supporting members 116 are disposed. As some examples, the external attachment feature 114 may be constructed as a threaded configuration, bayonet, or the like. As in FIGS. 1-4, it will be appreciated that the supporting members 116 and the external attachment feature 114 are not limited to the specific structure shown, and may be modified using various structures as may be suitable and/or necessary.

A flow attachment member 120 is disposed at an end that is opposite the supporting members 116. The flow attachment member 120 is connected to the housing 112 distal to the external attachment feature 114. In one embodiment, the flow attachment member 120 resembles a lid, cap, or cover-like structure having a stem 121 extending outwardly and distally relative to the open end of the housing 112. The stem 121 includes an inlet 124 so that fluid to be filtered can enter the housing 112 and so that fluid can access a flow path to the filter media 130. See arrows in FIG. 7. The stem 121 also includes an outlet 126 so that fluid that has been filtered by the filter media 130 can exit the housing 112. See arrows in FIG. 8. As shown, the inlet 124 and outlet 126 are confined within the stem 121 of the flow attachment member 120, where a flow separator 125 maintains flow through the inlet 124 and outlet 126 separate from each other.

Grooves 122 are disposed about an outer surface of the stem 121. As shown, the grooves 122 are disposed circumferentially around the stem 121. In one embodiment, the grooves 122 are configured as part of a sealing structure that can hold sealing members (not shown here, but shown in embodiments of FIGS. 11-16). The sealing members may be various structures, such as but not limited to resilient o-ring seals. It will be appreciated that the sealing structure may be accomplished in a variety of ways as one of skill in the art can construct. Some examples may include but are not limited to the o-ring seals described, various gasket configurations, and an interference-fit type structures. As shown, the grooves 122 provide for a sealing structure that is a dual o-ring seal. It will be appreciated that one o-ring seal or more than two o-ring seals may be employed as desired and/or necessary. It further will be appreciated that o-ring seals may not be used, or may be used in combination with other sealing structures, such as but not limited to gasket seals or interference fit seals.

As with the other fluid filters described herein, the stem 121 is configured to provide a unique interface between the filtering element and a filter head. Such a unique interface would have a radially fluid tight seal at the stem 121, where flow into and out of the fluid filter 100 is localized by flow paths of the flow attachment member 120, which are accessed through the inlet 124 and outlet 126 and confined within the stem 121. As shown, the stem 121 is relatively disposed proximate, or substantially at a center region, and generally at the open end of the housing 112. The stem 121 is shown disposed away from proximity of the perimeter wall edges of the housing 112. As one example, the stem 121 substantially is centrally disposed about a longitudinally centered axis of the fluid filter 100.

The housing 112 and flow attachment member 120 are connected in a fluid tight seal at their outer walls. In one embodiment, the housing 112 and the flow attachment member 120 are connected via a spin weld configuration. As shown, the housing 112 includes grips 118 and the flow attachment member 120 includes grips 128. In one example, the grips 118, 128 are used to connect the housing 112 and the flow attachment member 120 through a spin-welding process. Grips 118 are disposed about an outer surface of the housing 112, while grips 128 are disposed on an outer surface of the flow attachment member 120 and radially outward from the stem 121. In one embodiment, the grips 118, 128 generally resemble sawtooth grips. It will be appreciated that that the grips are not limited to the specific structure shown, and may be modified as suitable and/or necessary. It will further be appreciated that the housing 112 and flow attachment member 120 may not be connected via spin-welding, but by some other approach, so long as the fluid tight seal is achieved between the housing 112 and flow attachment member 120.

Turning to the filter media 130, the filter media 130 is disposed within the housing 112. The filter media 130 is connected to an endplate 132 disposed proximate the end where the support members 116 are disposed. The filter media 130 is configured to connect with the flow attachment member 120 in a fluid tight seal through another endplate 134. The filter media 130 is connected with another endplate 134. As shown, the filter media 130 is disposed between endplates 132, 134. The endplate 134 is disposed at an opposite end from the endplate 132, where the endplate 134 can sealingly engage with the flow attachment member 120 in a fluid tight seal.

In one embodiment, the flow attachment member 120 and the endplate 134 are connected by a press fit. As one example, the flow separator 125 includes an outer annular surface that sealingly engages with an annular surface and shoulder of the endplate 134. In such a configuration, the filter media 130 is connected to the flow attachment member 120 through a sealing engagement between the endplate 134 and the flow separator 125. In one embodiment, the filter media 130, the endplates 132, 134, and a center tube 136 (described in further detail below) together provide a cartridge assembly that is connected with the flow attachment member 120 in a fluid tight seal. It will be appreciated that the engagement between the endplate 134 and the flow attachment member 120 is not limited to the specific structure shown or to a press fit technique, and that other configurations may be employed for attaching the filter media 130 to the flow attachment member 120 as desired and/or necessary, so long as the fluid tight seal is accomplished. As some examples, the fluid tight seal between the filter media and the flow attachment member 120 can be accomplished through a two-shot molded seal, a trapped seal from two engaged components, or an insert molded seal.

Figure 7:
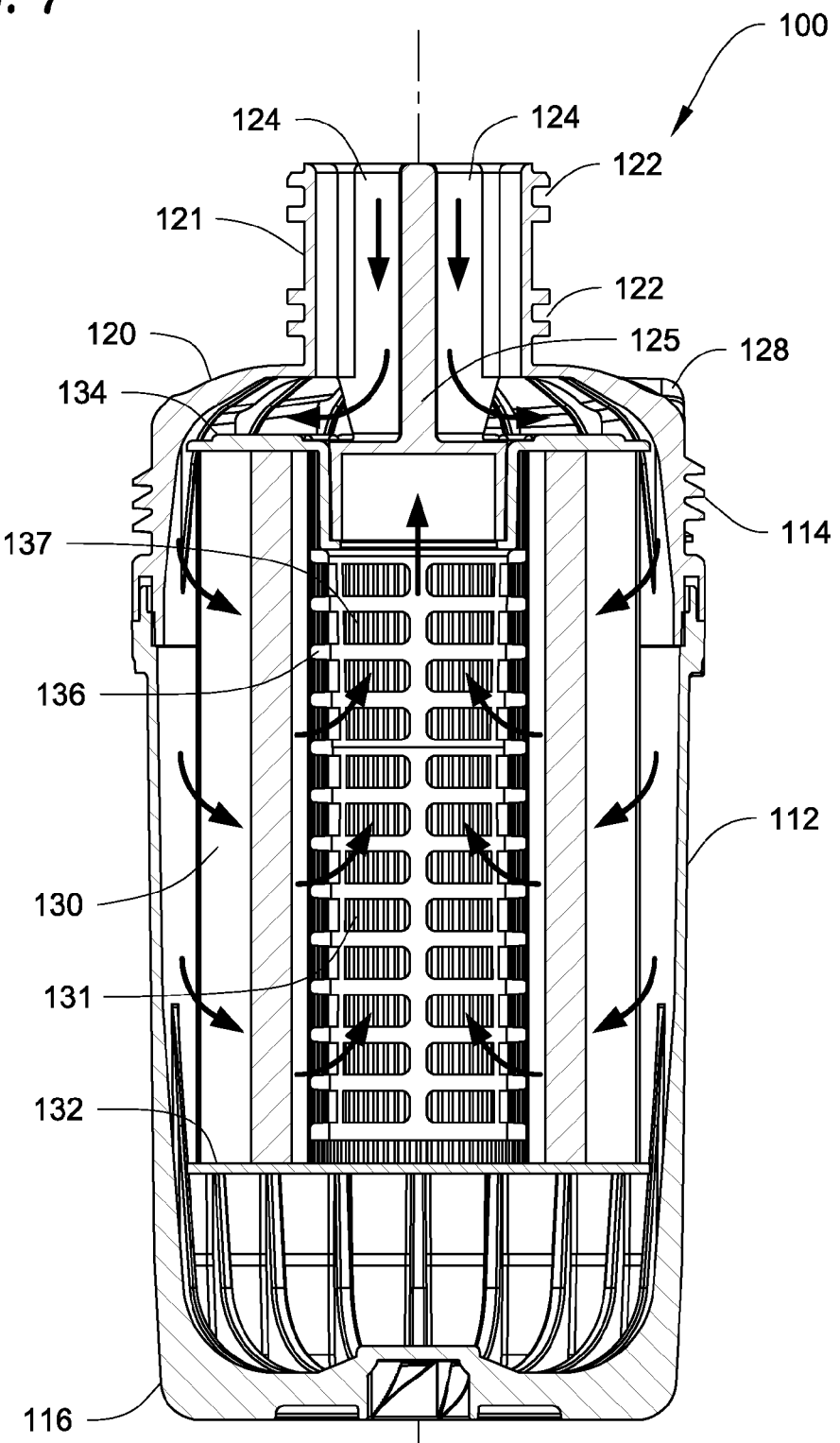
FIG. 7 illustrates a side sectional view of the fluid filter taken from line 7-7 of FIG. 5.
Figure 8:
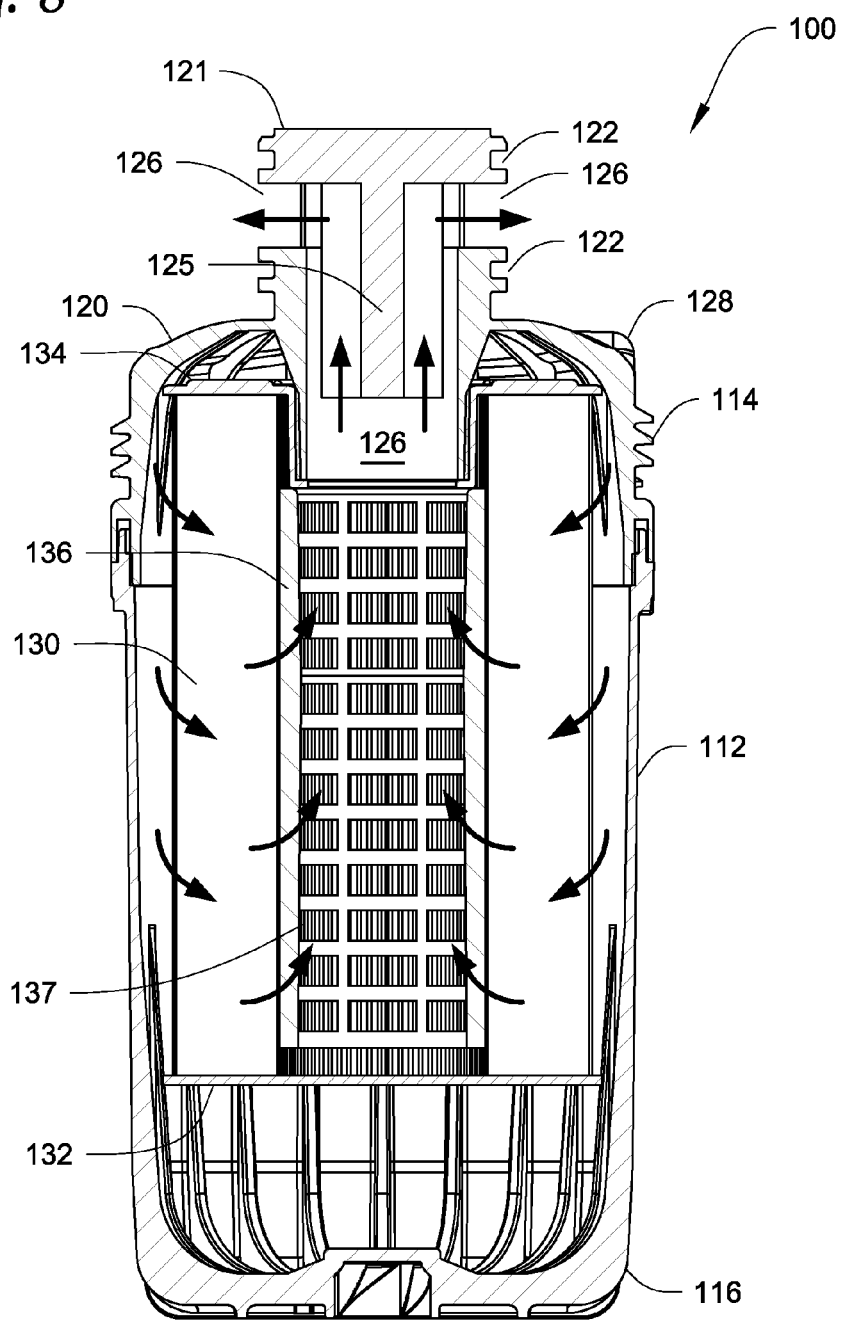
FIG. 8 illustrates a side sectional view of the fluid filter taken from line 8-8 of FIG. 5.

The filter media 130 may be constructed in various configurations, such as but not limited to a spiral wrap, pleated, insert molded, stack disc, or flow through configurations, combinations of these, or the like. As shown in FIGS. 7 and 8 the filter media 130 has a pleated configuration having folds 131. It will be appreciated that the material used for constructing the filter media 130 is not limited, so long as the filter media 130 will provide the desired filtering effect for its particular application.

In FIGS. 7 and 8, fluid flowing through the fluid filter 100 enters inlet 124 (see FIG. 7) and exits outlet 126 (see FIG. 8). As described, the stem 121 contains both the inlet 124 and outlet 126, where a flow separator 125 maintains the separate flow into and out of the fluid filter 100 (best shown in FIGS. 9 and 10).

Fluid enters the housing 112 from the inlet 124 and travels to an outer side of the filter media 130 and to a space between the filter media 130 and the inner wall of the housing 112. Fluid can then be filtered through the filter media 130 to its inner side. A center tube 136 is disposed within the filter media 130. In one example, the center tube 136 cooperates with the filter media 130 in a concentric configuration, where a plurality of openings 137 allow for fluid filtered by the filter media 130 to enter the center tube 136 and exit through the outlet 126. See arrows in the housing 112, filter media 130, and center tube 136. As with the filter media 130, the center tube 136 is disposed between the endplates 132, 134, and can provide further structural support for the filter media 130.

The flow configuration of FIGS. 5-10 provide a generally radial fluid flow at first, where fluid is directed radially outward to a position between the filter media 130 and housing 112. As described, the flow attachment member 120, its stem 121, and the seal structure provide a separated incoming and outgoing flow that is localized away from edges of the housing. In such a configuration, an external seal often employed in spin-on filters between a nutplate and housing can be eliminated. Further, a nutplate in such designs may also be eliminated if desired and/or necessary. See FIG. 25.

Figure 9:
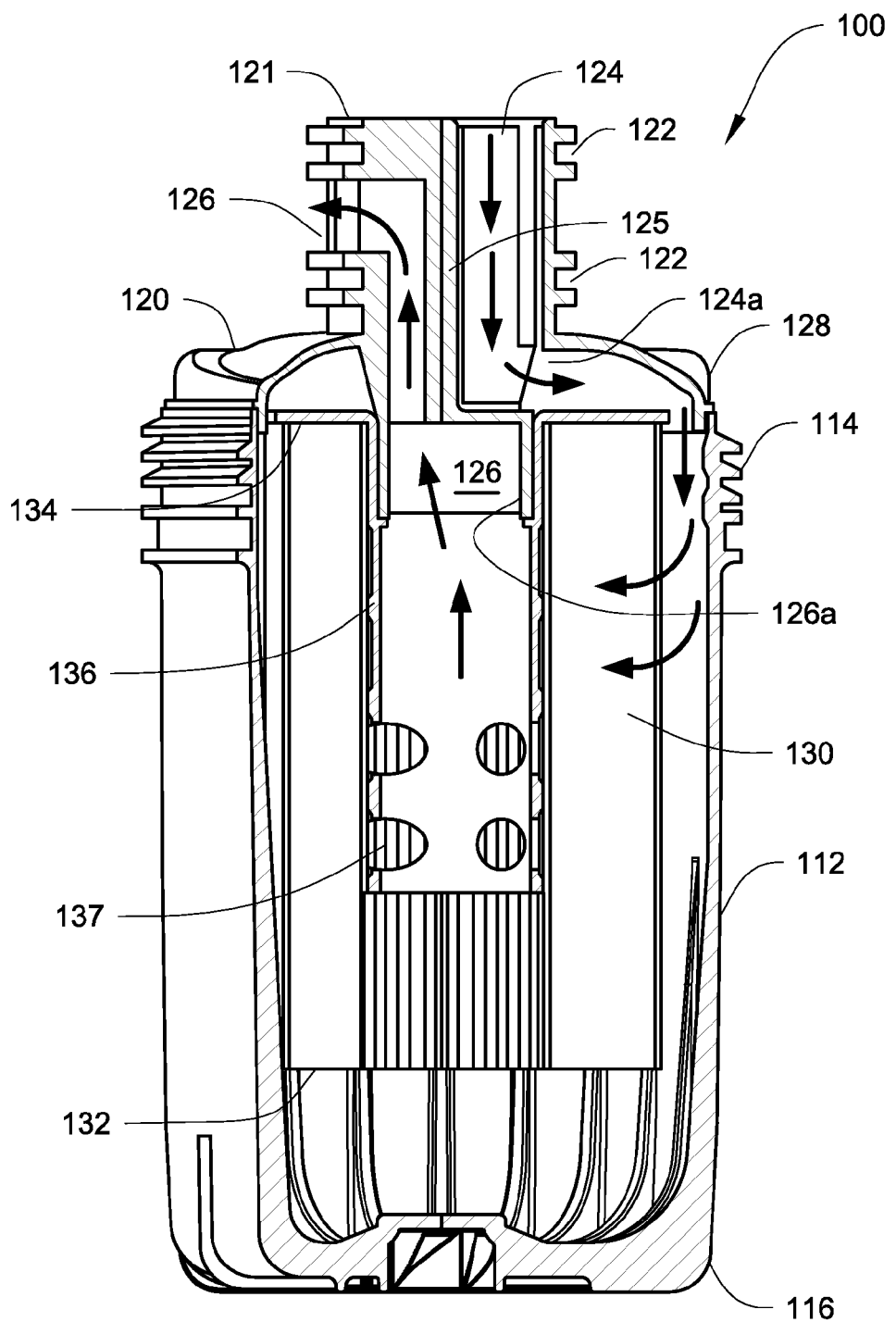
FIG. 9 illustrates another sectional view of the fluid filter of FIG. 5 showing one embodiment of a flow configuration therethrough.
Figure 10:
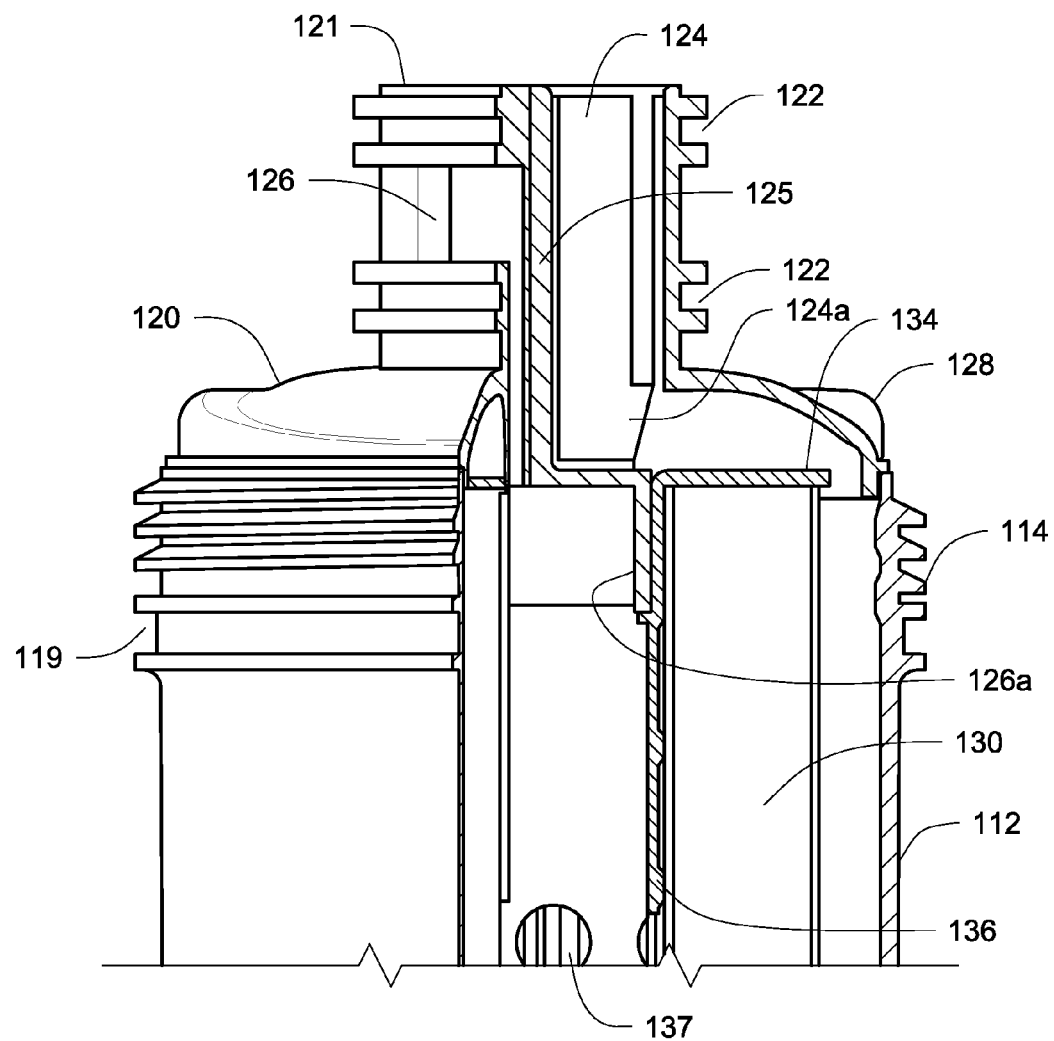
FIG. 10 illustrates a partial sectional view of the fluid filter of FIG. 5.

FIG. 9 shows more closely the entire flow path of the fluid through the fluid filter 100. FIG. 10 shows more closely the flow attachment member 120 structure including the flow separator 125. The flow separator 125 includes an opening 124a where the inlet 124 allows fluid to access the interior of the housing 112 and move to the filter media 130. The flow separator 125 also includes an opening 126a where fluid that has been filtered can access the outlet 126 and exit the filter media 130 and center tube 136. It will be appreciated that the fluid filter 10 may include the same flow configuration and openings as shown in FIGS. 9 and 10.

As further shown in FIG. 10, a groove 119 may be disposed at an outer surface of the housing 119 and proximate the external attachment feature 114. In one embodiment, the groove 119 may be provided as a position for an external seal member to be disposed if desired. It will be appreciated that the groove 119 may not be necessary for the housing 112 given the flow structure of the stem 121 and its outer seal structure. As one example, however, the groove 119 may be a square cut groove that can hold an o-ring seal or other gasket member if desired.

Figure 11:
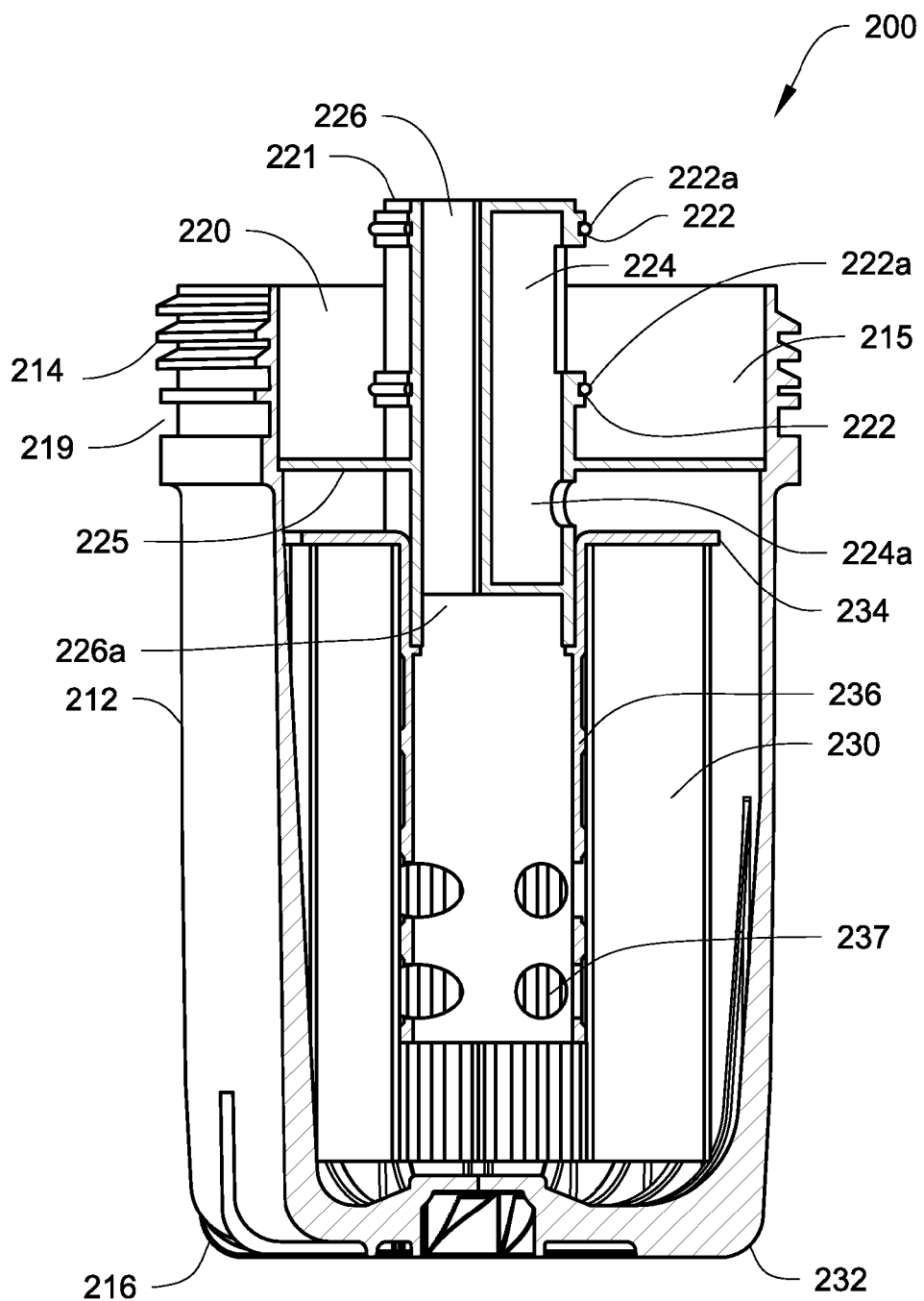
FIG. 11 illustrates a sectional view of yet another embodiment of a fluid filter.
Figure 12:
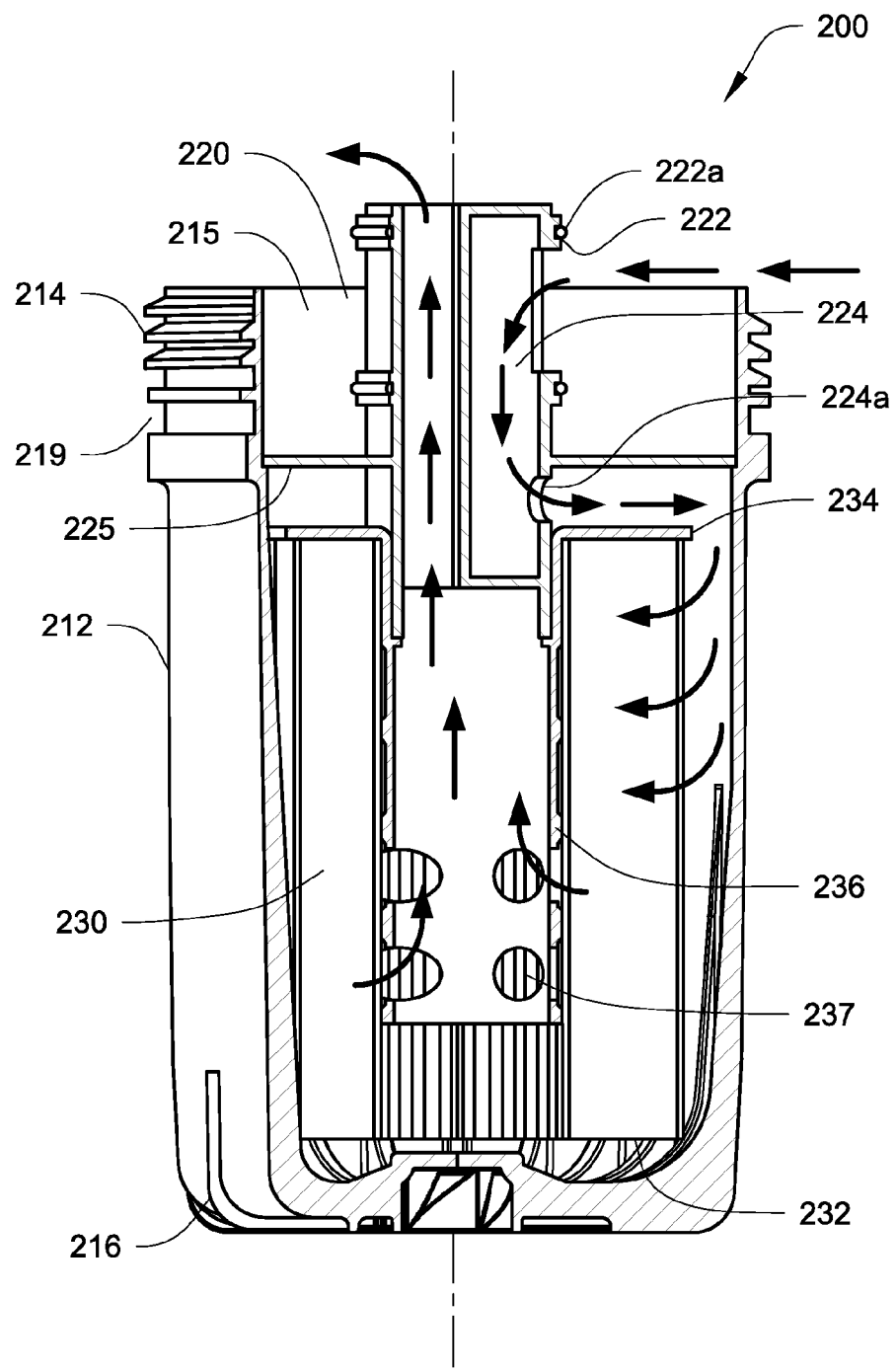
FIG. 12 illustrates another sectional view of the fluid filter of FIG. 11 and showing one embodiment of a flow configuration therethrough.

FIGS. 11-12 illustrate another embodiment of a fluid filter 200. The fluid filter includes a flow attachment member 220 generally configured with adjacent flow passages within a stem 221, where one flow passage leads fluid to be filtered to a filter media 230 through an inlet 224, and the other flow passage allows fluid to exit the fluid filter 200 through an outlet 226.

Similar to the other fluid filters described, fluid filter 200 includes a housing 212. The housing 212 generally is a cylindrical container or shell. The entire outer surface of the housing 212 is not shown, so that the inside of the fluid filter 200 can be conveniently shown. It will be appreciated the remaining outer surface of the housing is consistent with the outer surface which is shown. The housing 212 includes an end with a plurality of supporting members 216. The supporting members 216 protrude outward from the housing 212, and are radially disposed proximately to and about the end. In one embodiment, the supporting members 216 generally resemble rib-like portions. The housing 212 also includes an external attachment feature 214 disposed proximate an opposite end that the supporting members 216 are disposed. As some examples, the external attachment feature 214 may be constructed as a threaded configuration, bayonet, or the like. As in FIGS. 1-4, it will be appreciated that the supporting members 216 and the external attachment feature 214 are not limited to the specific structure shown, and may be modified using other structures as may be suitable and/or necessary.

A flow attachment member 220 is connected to the housing and is disposed proximate the end that is opposite the supporting members 216. In one embodiment, the flow attachment member 220 includes a flow separator 225 having a stem 221 connected to a plate member. In one example, the stem 221 extends through the plate member. The stem 221 extends outwardly and distally from an end of the filter media 230. In one example the stem 221 extends beyond the open end of the housing 212.

The stem 221 includes the inlet 224 so that fluid to be filtered can enter the housing 212 and so that fluid can access a flow path to the filter media 230. See arrows in FIG. 12. The stem 221 also includes the outlet 226 so that fluid that has been filtered by the filter media 230 can exit the housing 212 after traveling through a flow path from the filter media 130. As shown, the inlet 224 and outlet 226 are confined within the stem 221 of the flow attachment member 220, where the flow separator 225 maintains flow through the inlet 224 and outlet 226 separate from each other.

Grooves 222 are disposed about an outer surface of the stem 221. As shown, the grooves 222 are disposed circumferentially around the stem 221. In one embodiment, the grooves 222 are configured as part of a sealing structure that can hold sealing members 222a. The sealing members 222a may be various structures, such as but not limited to o-ring seals. It will be appreciated that the sealing structure may be accomplished in a variety of ways as one of skill in the art can construct. Some examples may include but are not limited to the o-ring seals described, various gasket configurations, and interference-fit type structures. As shown, the grooves 222 provide for a sealing structure such as a dual o-ring seal. It will be appreciated that one o-ring seal or more than two o-ring seals may be employed as desired and/or necessary. It further will be appreciated that o-ring seals may not be used, or may be used in combination with other sealing structures, such as but not limited to gasket seals or interference fit seals.

As with the other fluid filters described, the stem 221 is configured to provide a unique interface between the filtering element and a filter head. Such a unique interface would have a radially fluid tight seal at the stem 221, where flow into and out of the fluid filter 200 is localized by flow paths of the flow attachment member 220, and which are accessed through the inlet 224 and outlet 226 and confined within the stem 221. As shown, the stem 221 is relatively disposed proximate, or substantially at a center region, and generally at the open end of the housing 212. The stem 221 is shown disposed away from proximity of the perimeter wall edges of the housing 212. As one example, the stem 221 substantially is centrally disposed about a longitudinally centered axis of the fluid filter 200.

The flow attachment member 220 is connected to an inner side of a wall of the housing 212 in a fluid tight seal through the plate structure connected to the flow separator 225. In one embodiment, the housing 212 and the flow attachment member 220 are connected via a spin weld or snap fit configuration. It will be appreciated that that the connection between the flow attachment member 220 and the housing 212 may be modified as suitable and/or necessary, so long as the fluid tight seal is achieved between the housing 212 and flow attachment member 220.

A well area 215 is created when the flow attachment member 220 is connected to housing 212. In one example, the well area 215 is configured where the plate member of the flow attachment member 220 is disposed a distance inward from the open end of the housing 212. Such a configuration may further confine leakage.

Turning to the filter media 230, the filter media 230 is disposed within the housing 212. The filter media 230 is connected to an endplate 232 disposed proximate the end where the support members 216 are disposed. The filter media 230 is configured to connect with the flow attachment member 220 in a fluid tight seal. The filter media 230 is connected with another endplate 234. As shown, the filter media 230 is disposed between endplates 232, 234. The endplate 234 is disposed at an opposite end from the endplate 232, where the endplate 234 can sealingly engage with the flow attachment member 220 in a fluid tight seal.

In one embodiment, the flow attachment member 220 and the endplate 234 are connected by a press fit. As one example, the flow separator 225 includes an outer annular surface that sealingly engages with an annular surface and shoulder of the endplate 234. In such a configuration, the filter media 230 is connected with the flow attachment member 220 through a sealing engagement between the endplate 234 and the flow separator 225. In one embodiment, the filter media 230, the endplates 232, 234, and a center tube 236 (described in further detail below) together provide a cartridge assembly that is connected with the flow attachment member 220 in a fluid tight seal. It will be appreciated that the engagement between the endplate 234 and the flow attachment member 220 is not limited to the specific structure shown or to a press fit technique. Other configurations may be employed for attaching the filter media 230 to the flow attachment member 220 as desired and/or necessary, so long as the fluid tight seal is accomplished.

The filter media 230 may be constructed in various configurations, such as but not limited to a spiral wrap, pleated, insert molded, stack disc, or flow through configurations, combinations of these, or the like. As shown in FIGS. 11 and 12 the filter media 230 has a pleated configuration. It will be appreciated that the material used for constructing the filter media 230 is not limited, so long as the filter media 230 will provide the desired filtering effect for its particular application.

In FIG. 12, fluid flowing through the fluid filter 200 enters through the inlet 224 and exits through the outlet 226. As described, the stem 221 contains both the inlet 224 and outlet 226, where a flow separator 225 maintains the separate flow into and out of the fluid filter 200.

Fluid enters the housing 212 from the inlet 224 and travels to an outer side of the filter media 230 and to a space between the filter media 230 and the inner wall of the housing 212. Fluid can then be filtered through the filter media 230 to its inner side. A center tube 236 is disposed within the filter media 230. In one example, the center tube 236 cooperates with the filter media 230 in a concentric configuration, where a plurality of openings 237 allow fluid filtered by the filter media 230 to enter the center tube 236 and exit through the outlet 226. See arrows in the housing 212, filter media 230, and center tube 236. As with the filter media 230, the center tube 236 is disposed between the endplates 232, 234, and can provide further structural support for the filter media 130. As shown in one example, the endplate 234 includes the center tube 236 as an integral portion of the endplate 234.

The flow configuration shown in FIG. 12 generally provides a dual tube flow, where fluid is first directed through the inlet 224 and flow passage to the filter media, and is then directed through the outlet 226 and flow passage from the center tube 236 and filter media 230. As described, the flow attachment member 220, its stem 221, and the seal structure provide a separate incoming and outgoing flow that is localized away from edges of the housing. In such a configuration, an external seal often employed in spin-on filters between a nutplate and housing can be eliminated. Further, a nutplate in such designs may also be eliminated. See FIG. 25.

In FIG. 12, the entire flow path is shown, where the flow separator 225 includes an opening 224a where the inlet 224 allows fluid to access the interior of the housing 212 and flow to the filter media 230. The flow separator 225 also includes an opening 226a where fluid that has been filtered can access the outlet 226 and exit the filter media 230 and center tube 236.

As further shown in FIG. 12, a groove 219 may be disposed at an outer surface of the housing 219 and proximate the external attachment feature. In one embodiment, the groove 219 may be provided as a position for an external seal member to be disposed. It will be appreciated that the groove 219 may not be necessary for the housing 212 given the structure of the stem 221 and the sealing structure. As one example, however, the groove 219 may be a square cut groove that can hold an o-ring seal or other gasket member.

Figure 13:
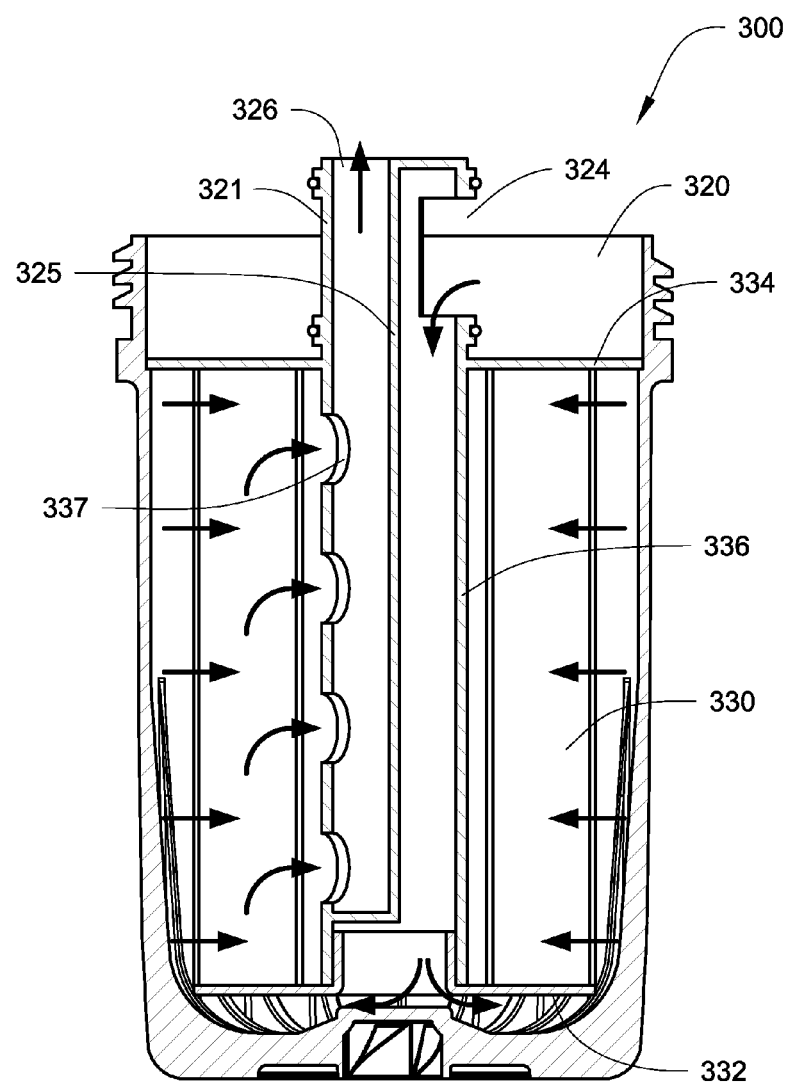
FIG. 13 illustrates a sectional view of another embodiment of fluid filter.

FIG. 13 illustrates another embodiment of a fluid filter 300. The fluid filter 300 includes some similar features, such as fluid filter 200, which are not further described. The fluid filter 300 includes a flow attachment member 320 generally configured with adjacent flow passages within a stem 321. The flow configuration through the stem 321 generally resembles a full length split channeled tube.

In FIG. 13, fluid flowing through the fluid filter 300 enters through the inlet 324 and exits through the outlet 326. The stem 321 contains both the inlet 324 and outlet 226, where a flow separator 325 maintains the separate flow into and out of the fluid filter 300. Fluid filter 300 also includes a seal structure similarly disposed as fluid filter 200.

Fluid enters the housing from the inlet 324 of the stem and travels through a center tube 336 of the stem on the intake side. Fluid flows to a space between an endplate 332, connected to the filter media 330, and an inner wall of the housing. Fluid can then be filtered through the filter media 330 to its inner side and to the center tube 336. As shown, the center tube 336 is a part of the stem 321, and is disposed within the filter media 330. The center tube 336 cooperates with the filter media 330, where a plurality of openings 337 allow fluid filtered by the filter media 330 to enter the center tube 336 on the outlet side and to exit through the outlet 326. See arrows in the housing, filter media 330, and center tube 336. As shown in one example, the flow attachment member 320 includes the endplate 334 and the center tube 336 as an integral portion of the flow attachment member 320.

The flow configuration shown in FIG. 13 generally provides a full length split channeled tube. As described, the flow attachment member 320 and its stem 321 and the seal structure provide a separated incoming and outgoing flow that is localized away from edges of the housing.

Figure 14:
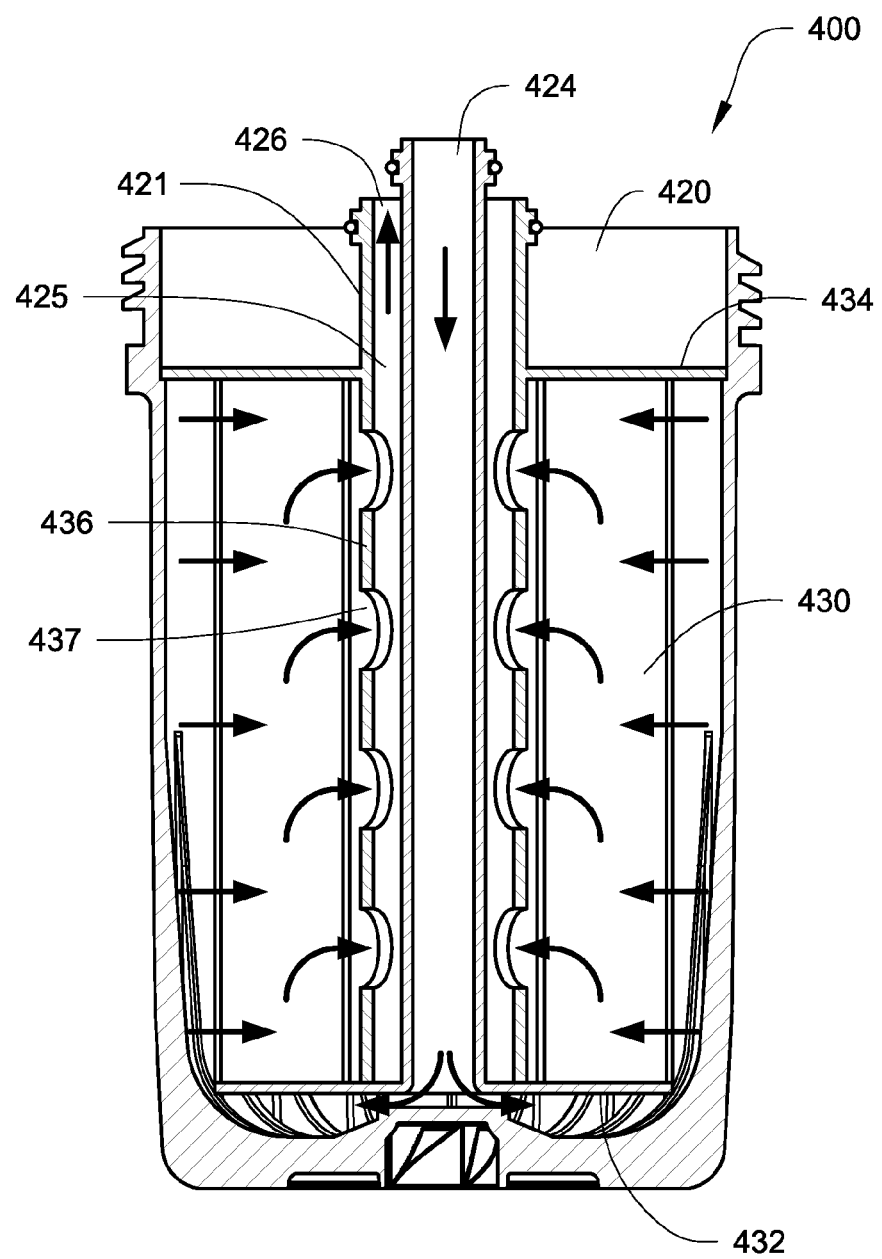
FIG. 14 illustrates a sectional view of yet another embodiment of fluid filter.

FIG. 14 illustrates yet another embodiment of a fluid filter 400. The fluid filter 400 includes some similar features, such as fluid filter 200, which are not further described. The fluid filter 400 includes a flow attachment member 420 generally configured with adjacent flow passages within a stem 421. The flow configuration through the stem 421 generally resembles a full length concentrically channeled tube.

In FIG. 14, fluid flowing through the fluid filter 400 enters through the inlet 424 and exits through the outlet 426. The stem 421 contains both the inlet 424 and outlet 426, where a flow separator 425 maintains the separate flow into and out of the fluid filter 400. Fluid filter 400 also includes a relatively similar seal structure as in fluid filter 200. As shown, the seal structure may be a dual o-ring seal, where one of the seals is disposed on a tube having the inlet 424 and the other seal is disposed on a tube having the outlet 426.

Fluid enters the housing from the inlet 424 of the stem and travels through a center tube 436 of the stem 421 through the intake tube. Fluid flows to a space between an endplate 432, connected to the filter media 430, and an inner wall of the housing. Fluid can then be filtered through the filter media 430 to its inner side and back to the center tube 436. As shown, the center tube 436 is a part of the stem 421, and is disposed within the filter media 430. The center tube 436 cooperates with the filter media 430, where a plurality of openings 437 allow fluid filtered by the filter media 430 to enter the center tube 436 on the outlet side. Fluid may then exit through the outlet 426. See arrows in the housing, filter media 430, and center tube 436. As shown in one example, the flow attachment member 420 includes the endplate 434 and the center tube 436 as an integral portion of the flow attachment member 420. Further, the flow attachment member 420 includes the endplate 432 and the tube having the inlet 424 as an integral structure. In such a configuration, the flow attachment member 420 may be a part of a filter cartridge structure.

The flow configuration shown in FIG. 14 generally provides a full length concentrically channeled tube. As described, the flow attachment member 420 with its stem 421 and seal structure provide a separated incoming and outgoing flow that is localized away from edges of the housing.

Figure 15:
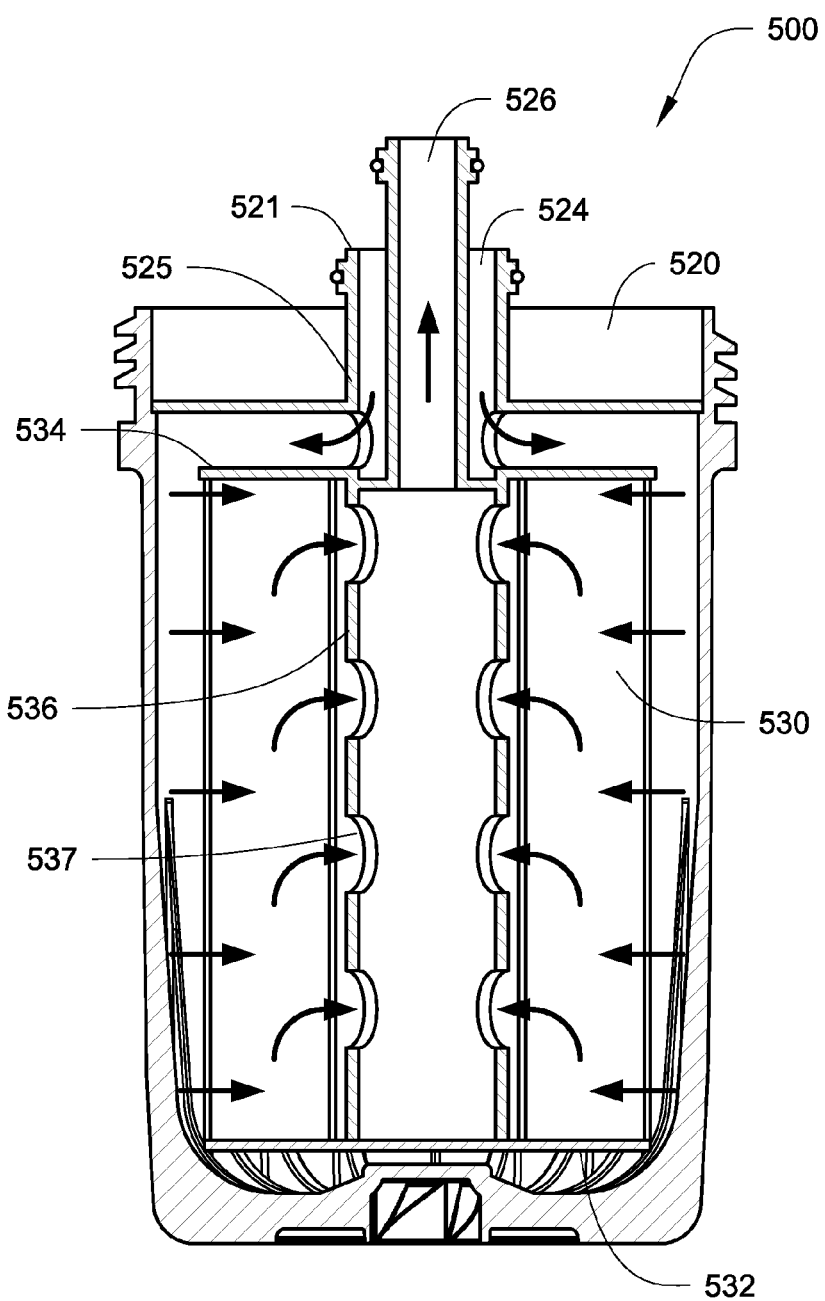
FIG. 15 illustrates a sectional view of yet another embodiment of fluid filter.

FIG. 15 illustrates yet another embodiment of a fluid filter 500. The fluid filter 500 includes some similar features, such as fluid filter 200, which are not further described. The fluid filter 500 includes a flow attachment member 520 generally configured with adjacent flow passages through a stem 521. The flow configuration through the stem 521 generally resembles concentrically channeled tubes having a dual endplate.

In FIG. 15, fluid flowing through the fluid filter 500 enters through the inlet 524 and exits through the outlet 526. The stem 521 contains both the inlet 524 and outlet 526, where a flow separator 525 maintains the separate flow into and out of the fluid filter 500. Fluid filter 500 also includes a seal structure relatively similar as fluid filter 200. As shown, the seal structure may be a dual o-ring seal, where one of the seals is disposed on a tube having the inlet 524 and the other seal is disposed on a tube having the outlet 526.

Fluid enters the housing from the inlet 524 of the stem and through the intake tube. Fluid is then directed by the flow separator 525 between an outer plate member and endplate 534 (or dual endplate structure). The outer plate member is sealingly connected with the housing. Fluid flows to a space between a filter media 530 and an inner wall of the housing. Fluid can then be filtered through the filter media 530 to its inner side and to a center tube 536. As shown, the center tube 536 is a part of the stem 521, and is disposed within the filter media 530. The center tube 536 cooperates with the filter media 530, where a plurality of openings 537 allow fluid filtered by the filter media 530 to enter the center tube 536 and to flow through the exit tube. Fluid may then exit through the outlet 526. See arrows in the stem 521, housing, filter media 530, and center tube 536. As shown in one example, the flow attachment member 520 includes the outer plate member, endplate 534, and the center tube 536 as an integral portion of the flow attachment member 520.

The flow configuration shown in FIG. 15 generally provides a concentrically channeled tube with a dual endplate. As described, the flow attachment member 520 with its stem 521 and seal structure provide a separated incoming and outgoing flow that is localized away from edges of the housing.

Figure 16:
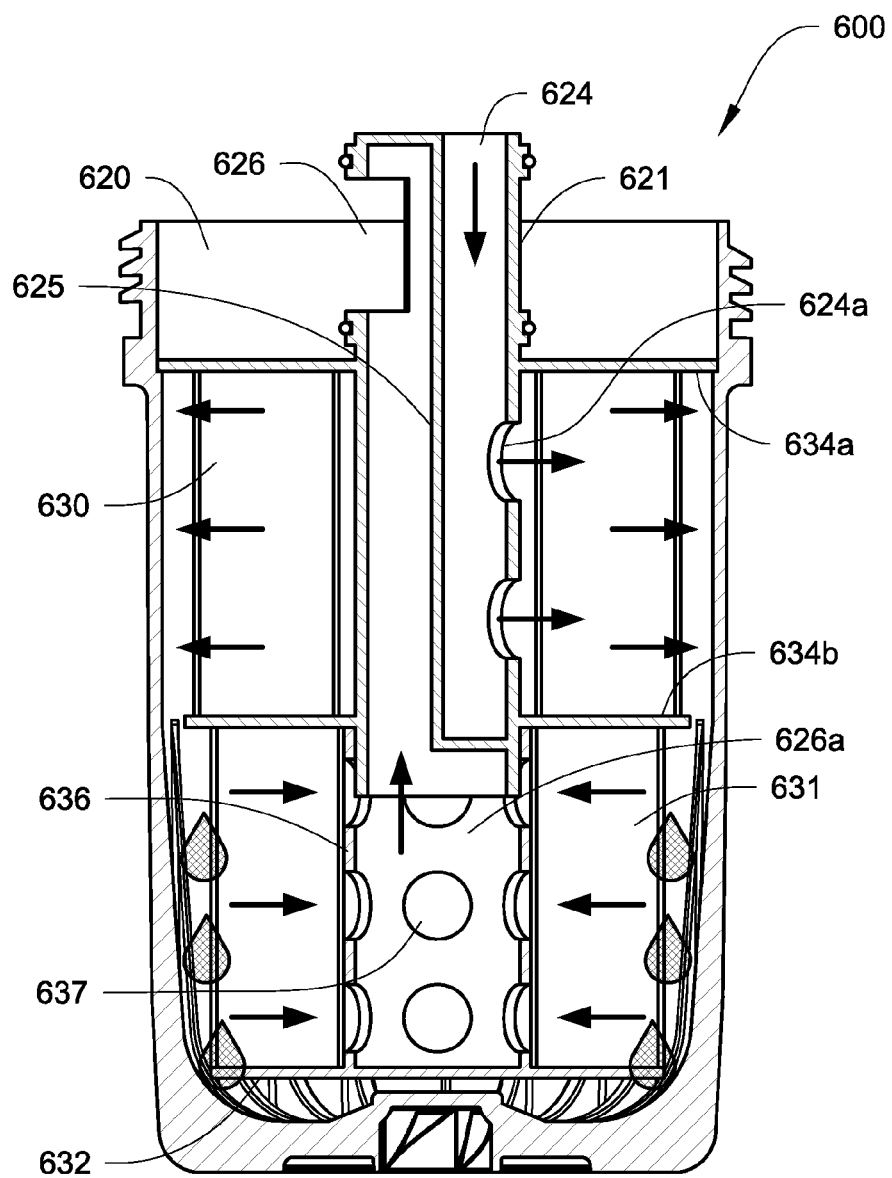
FIG. 16 illustrates a sectional view of yet another embodiment of fluid filter.
Figure 17:
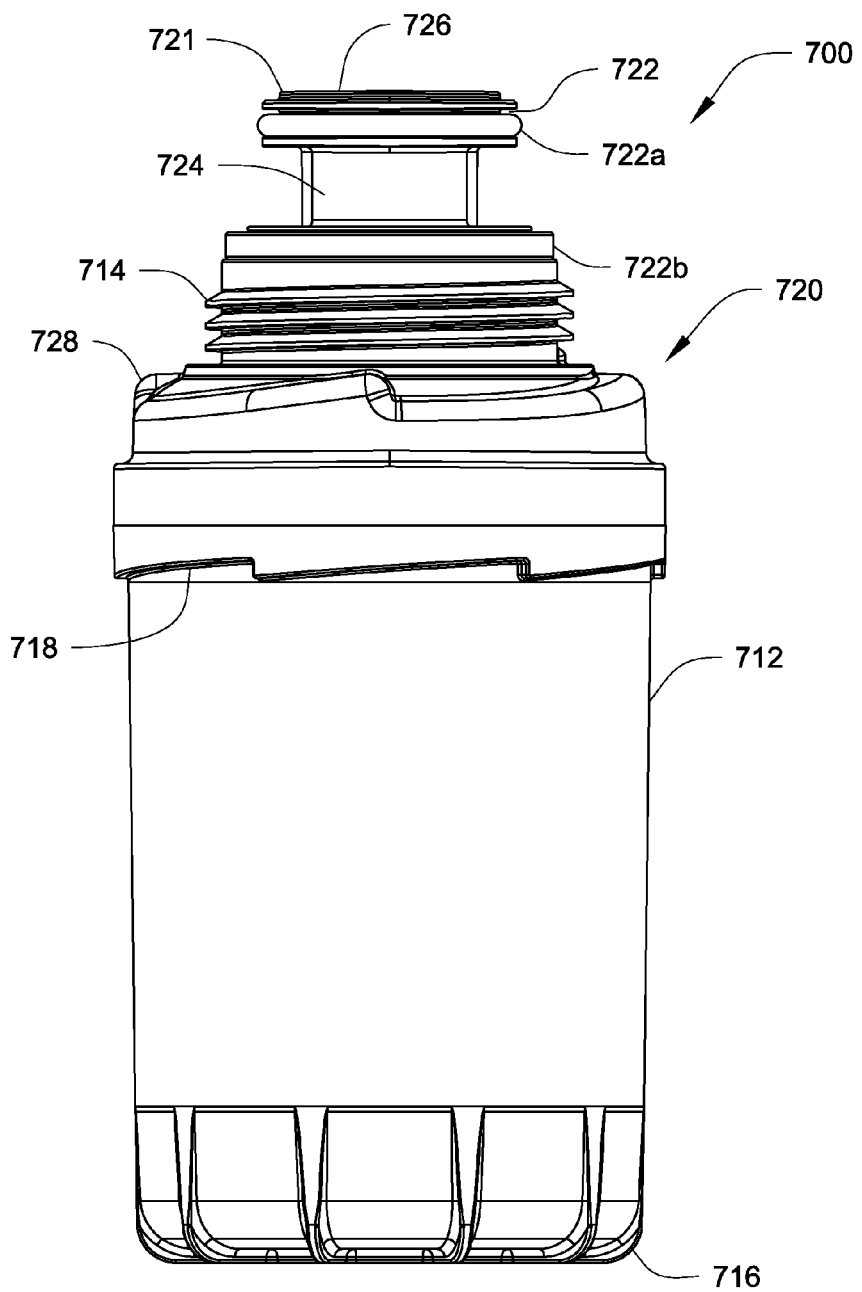
FIG. 17 illustrates a side view of yet another embodiment of a fluid filter.

FIG. 16 illustrates yet another embodiment of a fluid filter 600. The fluid filter 600 includes some similar features, such as fluid filter 200, which are not further described. The fluid filter 600 includes a flow attachment member 620 generally configured with adjacent flow passages through a stem 621. The flow configuration through the stem 621 generally resembles dual endplate with split flow.

In FIG. 16, fluid flowing through the fluid filter 600 enters through the inlet 624 and exits through the outlet 626. The stem 621 contains both the inlet 624 and outlet 626, where a flow separator 625 maintains the separate flow into and out of the fluid filter 600. Fluid filter 600 also includes a seal structure relatively similar as in fluid filter 200, where the seal structure may be a dual o-ring seal.

Fluid enters the housing from the inlet 624 of the stem 621. Fluid is then directed by the flow separator 625 through a flow passage and openings 624a. A dual endplate structure 634a, 634b allows fluid flow through a first filter media 630. The top or outer endplate 634a is sealingly connected with the housing. Fluid can then flow to a space between the first filter media 630 and an inner wall of the housing. Fluid may flow or drop down toward endplate 632, where it can then be filtered through a second filter media 631. Once fluid has filtered to an inner side of the second filter media 631, it then flows through openings 637 of center tube 636. Opening 626a allows fluid to flow through the exit flow passage and through the outlet 626. See droplets shown and arrows in the stem 621, housing, first and second filter media 630, 631, and center tube 636. As shown in one example, the flow attachment member 620 includes the dual endplate 634a, 634b as an integral portion of the flow attachment member 620.

The flow configuration shown in FIG. 16 generally provides a dual endplate with split flow through the fluid filter and through distinct sections of filter media. As described, the flow attachment member 620 with its stem 621 and seal structure provide a separated incoming and outgoing flow that is localized away from edges of the housing. The split flow configuration and dual endplate can allow for two-way filtering which can incorporate different filter media types. For example, one of the first and second filter media may be configured for filtering fuel, while the other of the first and second filter media may be configured for filtering water.

FIGS. 17-20 illustrate another embodiment of a fluid filter 700. The fluid filter 700 is similar to the fluid filter 100, in that fluid filter 700 includes an external attachment feature 714 disposed on an outer cylindrical surface of the flow attachment member 720. Similar components and parts are briefly mentioned as follows.

The housing 712 generally is a cylindrical container or shell and includes an end with a plurality of supporting members 716. The supporting members 716 protrude outward from the housing 712, and are radially disposed proximately to and about the end. In one embodiment, the supporting members 716 generally resemble rib-like portions. The external attachment feature 714 is disposed proximate an opposite end that the supporting members 716 are disposed. As some examples, the external attachment feature 714 may be constructed as a threaded configuration, bayonet, or the like. It will be appreciated that the supporting members 716 and the external attachment feature 714 are not limited to the specific structure shown, and may be modified using various structures as may be suitable and/or necessary.

The flow attachment member 720 is disposed at an end that is opposite the supporting members 716 and generally at an open end of the housing 712. The flow attachment member 720 is connected to the housing 712. In one embodiment, the flow attachment member 720 resembles a lid, cap, or cover-like structure having a stem 721 extending outwardly and distally relative to the end of the housing 712. The stem 721 includes an inlet 724 so that fluid to be filtered can enter the housing 712 and can access a flow path to the filter media 730. See arrows in FIG. 19. The stem 721 also includes an outlet 726 so that fluid that has been filtered by the filter media 730 can exit the housing 712. As shown, the inlet 724 and outlet 726 are confined within the stem 721 of the flow attachment member 720, where a flow separator 725 maintains flow through the inlet 724 and outlet 726 separate from each other.

Figure 18:
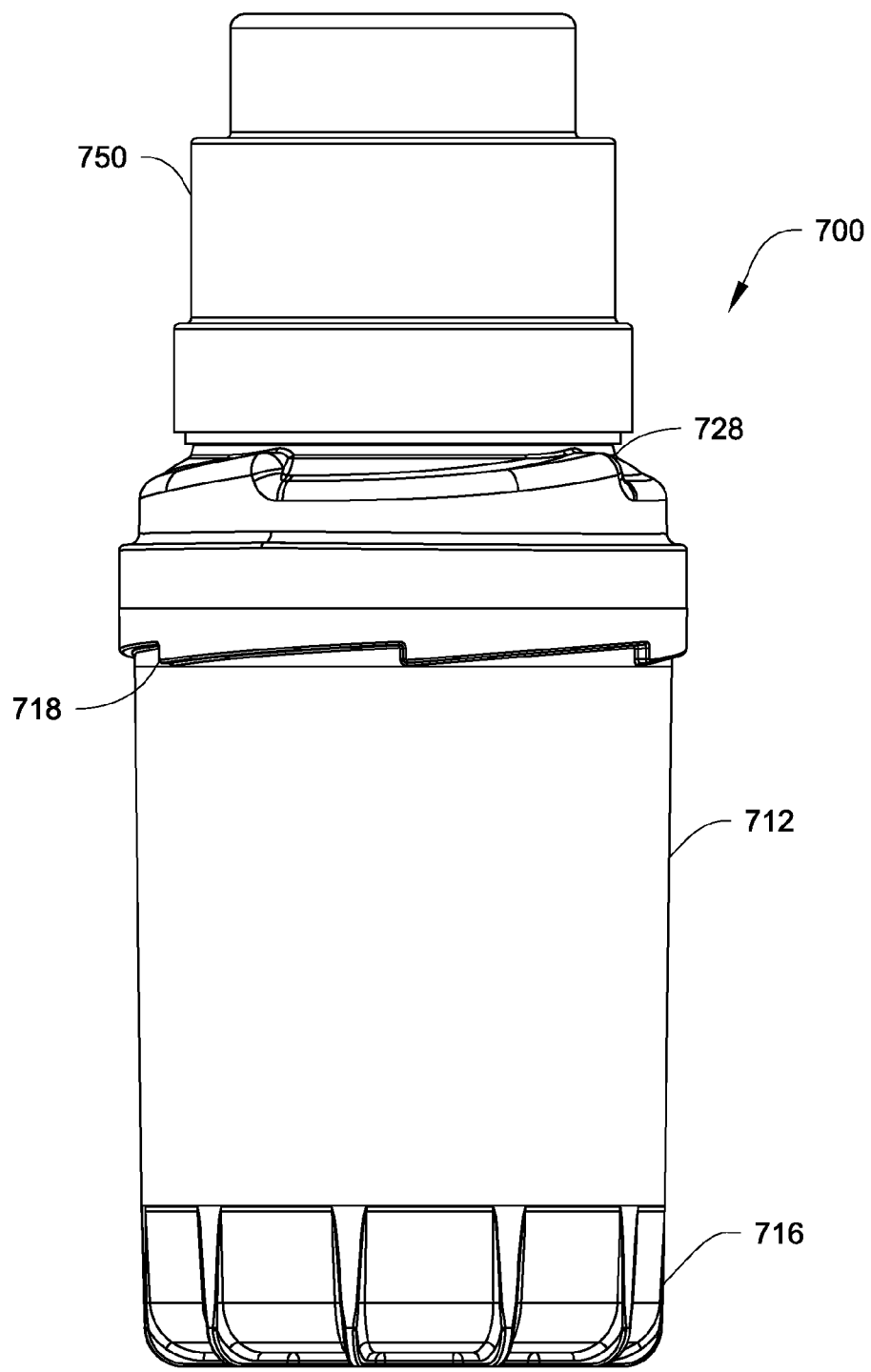
FIG. 18 illustrates a side view of the fluid filter of FIG. 17 and showing one embodiment of an attachment head connected to the fluid filter.
Figure 19:
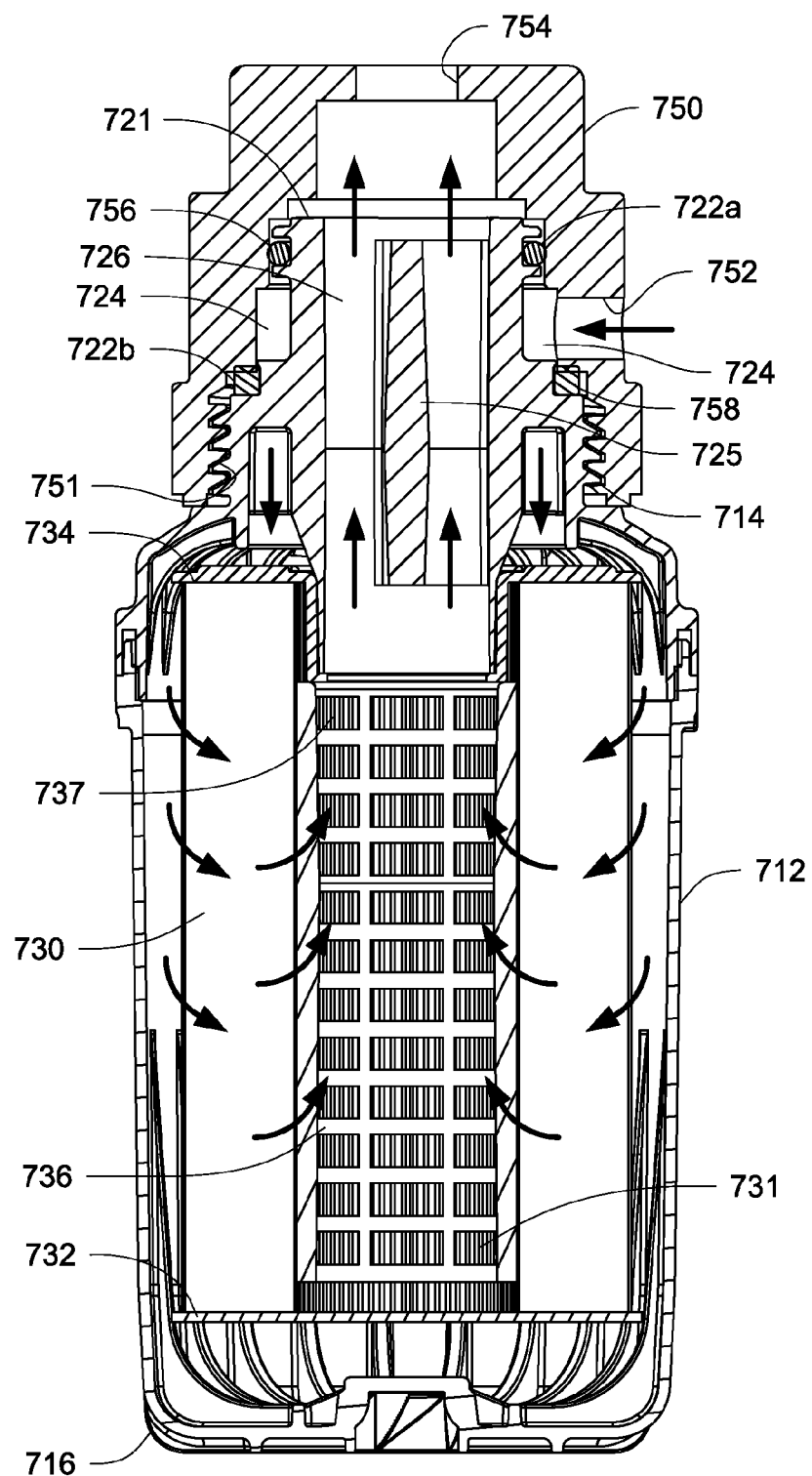
FIG. 19 illustrates a sectional view of the fluid filter and attachment head of FIG. 18.
Figure 20:
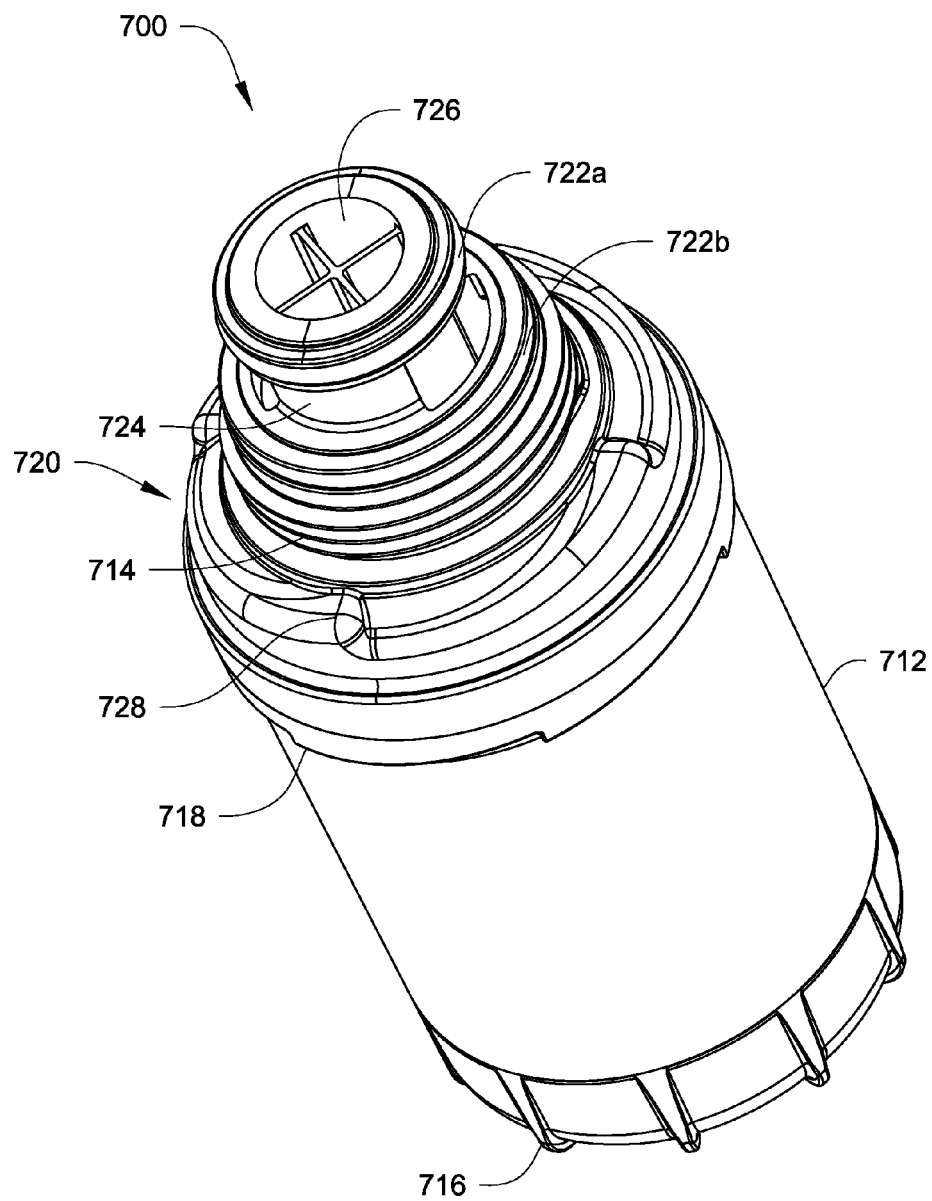
FIG. 20 illustrates a perspective view of the fluid filter of FIG. 17.
Figure 21:
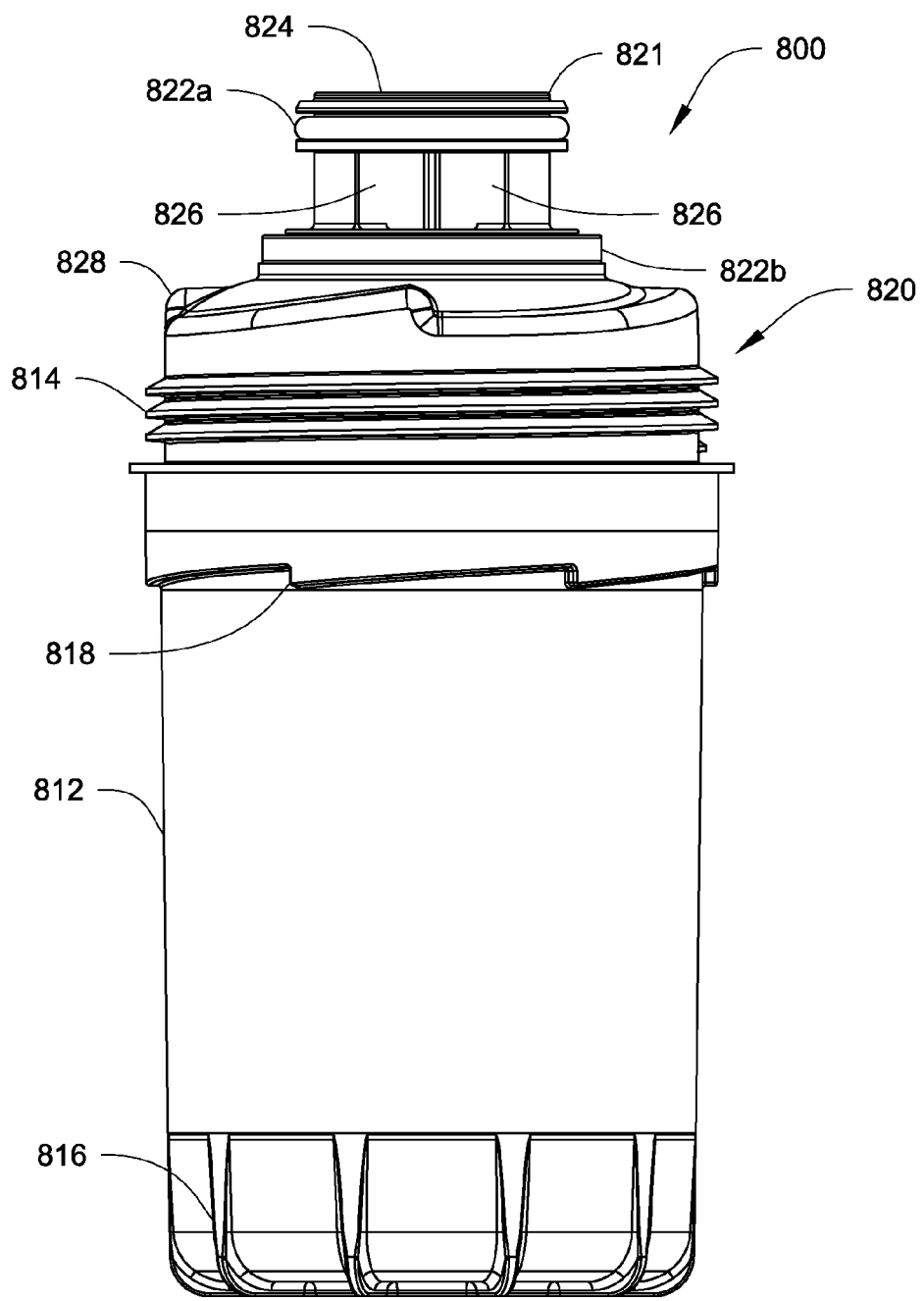
FIG. 21 illustrates a side view of yet another embodiment of a fluid filter.
Figure 22:
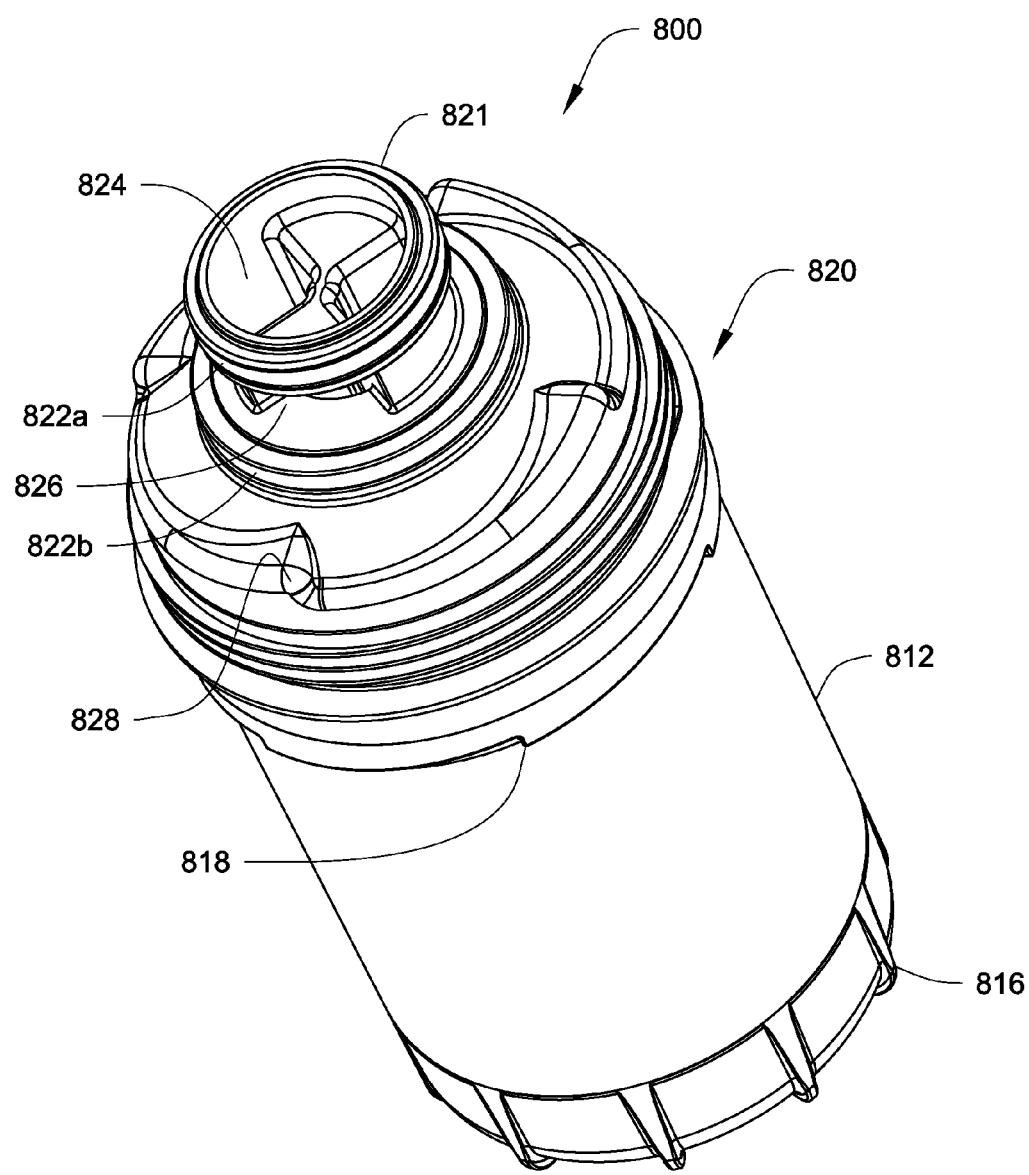
FIG. 22 illustrates a perspective view the fluid filter of FIG. 21.

FIGS. 18 and 19 also show one embodiment of a filter head 750 for connecting the fluid filter 700 to a fluid system. Internal attachment feature 751 is disposed on an inner surface of the filter head 750, and is for engaging with the external attachment feature 714 of the fluid filter 700. As some examples, the internal attachment feature 751 may be constructed as a threaded configuration, bayonet, or the like. It will be appreciated that the internal attachment feature is not limited so long as it may engage with the external attachment feature 714 of the fluid filter 700 to connect the fluid filter 700 to the filter head 750.

The filter head 750 includes an opening 752 for accessing the inlet 724 of the fluid filter 700. The filter head 750 also includes an opening 754 for accessing the outlet 726. Annular surfaces 756, 758 are disposed on inner surfaces of the filter head. The annular surfaces 756, 758 engage with a sealing structure, which is further described hereinafter.

A groove 722 is disposed about an outer surface of the stem 721. As shown, the groove 722 is disposed circumferentially around the stem 721 proximate the end, and between the inlet 724 and the end of the stem 712. In one embodiment, the groove 722 is configured as part of a sealing structure that can hold a sealing member 722a. As shown, the sealing member 722a is a resilient o-ring seal as one example.

Differently from the dual o-ring structure of fluid filter 100, the sealing structure of the fluid filter 700 includes one o-ring seal proximate the end of the stem 721, and a flange or face seal 722b disposed between the o-ring seal and the end of the housing 712. The flange or face seal member 722b may be a gasket member, such as a resilient square gasket disposed around the stem 721 and between inlet 724 and the external attachment feature 714. The face seal 722b is disposed on an outer annular shoulder of the stem 721. It will be appreciated that the seal member 722a and the seal member 722b may be interchangeable as desired and/or necessary. For example, the seal member 722b (or face seal) and annular shoulder may be disposed where the groove 722 and seal member 722a (or o-ring) are disposed. Likewise, the groove 722 and seal member 722a may be disposed where the seal member 722b and annular shoulder are disposed.

Turning back to the annular surfaces 756, 758 of the filter head, these annular surfaces 756, 758 respectively engage with the sealing members 722a, 722b. The annular surfaces and the sealing members respectively engage in a fluid tight seal, so as to maintain separate flow paths of the inlet 724 and outlet 726 when the fluid filter 700 is connected with the filter head 750.

It will be appreciated that the sealing structure configuration may be accomplished in a variety of ways as one of skill in the art can construct. For example, the sealing structure may be constructed of various configurations, including but not limited to a dual o-ring seal as in fluid filter 100, or one o-ring seal and one face sealing gasket as fluid filter 700, or two face sealing gaskets (not shown). It further will be appreciated that o-rings and gasket seals may not be employed at all, such as where an interference fit between the stem and the filter head may accomplish a sufficient seal.

As with the other fluid filters described, the stem 721 is configured to provide a unique interface between the filtering element and a filter head. Such a unique interface would have a radially fluid tight seal at the stem 721, where flow into and out of the fluid filter 700 is localized by flow paths of the flow attachment member 720, which are accessed through the inlet 724 and outlet 726 and confined within the stem 721. As shown, the stem 721 is relatively disposed proximate, or substantially at a center region, and at the open end of the housing 712. The stem 721 is shown disposed away from proximity of the perimeter wall edges of the housing 712. As one example, the stem 721 substantially is centrally disposed about a longitudinally centered axis of the fluid filter 700.

The housing 712 and flow attachment member 720 are connected in a fluid tight seal at their outer walls. In one embodiment, the housing 712 and the flow attachment member 720 are connected via a spin weld configuration. As shown, the housing 712 includes grips 718 and the flow attachment member 720 includes grips 728. In one example, the grips 718, 728 are used to connect the housing 712 and the flow attachment member 720 through a spin-welding process. Grips 718 are disposed about an outer surface of the housing 712, while grips 728 are disposed on an outer surface of the flow attachment member 720 and radially outward from the stem 721. In one embodiment, the grips 718, 728 generally resemble sawtooth grips. It will be appreciated that that the grips are not limited to the specific structure shown, and may be modified as suitable and/or necessary. It will further be appreciated that the housing 712 and flow attachment member 720 may not be connected via spin-welding, but by some other approach, so long as the fluid tight seal is achieved between the housing 712 and flow attachment member 720.

Similarly as fluid filter 100, the filter media 730 is disposed within the housing 712. The filter media 730 is connected to an endplate 732 disposed proximate the end where the support members 716 are disposed. The filter media 730 is configured to connect with the flow attachment member 720 in a fluid tight seal. The filter media 730 is connected with another endplate 734. As shown, the filter media 730 is disposed between endplates 732, 734. The endplate 734 is disposed at an opposite end from the endplate 732, where the endplate 734 can sealingly engage with the flow attachment member 720 in a fluid tight seal.

In one embodiment, the flow attachment member 720 and the endplate 734 are connected by a press fit. As one example, the flow separator 725 includes an outer annular surface that sealingly engages with an annular surface and shoulder of the endplate 734. Thus, the filter media 730 is connected to the flow attachment member 720 through a sealing engagement between the endplate 734 and the flow separator 725. In one embodiment, the filter media 730, the endplates 732, 734, and a center tube 736 (described in further detail below) together provide a cartridge assembly that is connected with the flow attachment member 720 in a fluid tight seal. It will be appreciated that the engagement between the endplate 734 and the flow attachment member 720 is not limited to the specific structure shown or to a press fit technique, and that other configurations may be employed for attaching the filter media 730 to the flow attachment member 720 as desired and/or necessary, so long as the fluid tight seal is accomplished.

As with the previous filter media described, the filter media 730 may be constructed in various configurations, such as but not limited to a spiral wrap, pleated, insert molded, stack disc, or flow through configurations, combinations of these, or the like. As shown in FIG. 19, the filter media 730 has a pleated configuration having folds 731. It will be appreciated that the material used for constructing the filter media 730 is not limited, so long as the filter media 730 will provide the desired filtering effect for its particular application.

In FIG. 19, fluid flowing through the fluid filter 700 enters inlet 724 and exits outlet 726. The stem 721 contains both the inlet 724 and outlet 726, where a flow separator 725 maintains the separate flow into and out of the fluid filter 700. While the flow path of fluid is not completely shown in FIG. 19, it will be appreciated that fluid filter 700 employs a similar flow path construction as shown in FIGS. 9 and 10 of fluid filter 100, except that the flow path is reversed. That is, the inlet 724 and outlet 726 are switched, such that fluid to be filtered enters the side of the stem 721, and fluid that has been filtered exits the end of the stem 721. In such a configuration, the fluid filter 700 can operate as a standard spin-on type fluid filter, where filtered fluid exits the center and top of the fluid filter. Even further, the fluid filter can be adapted for use in existing fuel and oil filtration systems employing traditional spin-on type fluid filters.

As shown by FIG. 19, fluid enters the housing 712 from the inlet 724 and travels to an outer side of the filter media 730 and to a space between the filter media 730 and the inner wall of the housing 712. Fluid can then be filtered through the filter media 730 to its inner side. A center tube 736 is disposed within the filter media 730. In one example, the center tube 736 cooperates with the filter media 730 in a concentric configuration, where a plurality of openings 737 allow for fluid filtered by the filter media 730 to enter the center tube 736 and exit through the outlet 726. As with the filter media 730, the center tube 736 is disposed between the endplates 732, 734, and can provide further structural support for the filter media 730.

The flow configuration of FIGS. 17-20 provide a generally radial fluid flow at first, where fluid is directed radially outward to a position between the filter media 730 and housing 712. As described, the flow attachment member 720, its stem 721, and the seal structure provide a separated incoming and outgoing flow that is localized away from edges of the housing. In such a configuration, an external seal often employed in spin-on filters between a nutplate and housing can be eliminated. Further, a nutplate in such designs may also be eliminated. See FIG. 25.

FIGS. 21-24 illustrate another embodiment of a fluid filter 800. The fluid filter 800 is similar to the fluid filter 100, except that fluid filter 800 includes an external attachment feature 814 is disposed on an outermost cylindrical surface of the flow attachment member 820. Similar components and parts are briefly mentioned as follows.

The fluid filter 800 includes a housing 812. The housing 812 generally is a cylindrical container or shell. The housing 812 includes an end with a plurality of supporting members 816. The supporting members 816 protrude outward from the housing 812, and are radially disposed proximately to and about the end. In one embodiment, the supporting members 816 generally resemble rib-like portions. The external attachment feature 814 is disposed proximate an opposite end that the supporting members 816 are disposed. As some examples, the external attachment feature 814 may be constructed as a threaded configuration, bayonet, or the like. It will be appreciated that the supporting members 816 and the external attachment feature 814 are not limited to the specific structure shown, and may be modified using various structures as may be suitable and/or necessary.

The flow attachment member 820 is disposed at an end that is opposite the supporting members 816, and is connected to the housing 812. In one embodiment, the flow attachment member 820 resembles a lid, cap, or cover-like structure having a stem 821 extending outwardly and distally relative to the open end of the housing 812. The stem 821 includes an inlet 824 so that fluid to be filtered can enter the housing 812 and can access a flow path to the filter media 830. See arrows in FIG. 24. The stem 821 also includes an outlet 826 so that fluid that has been filtered by the filter media 830 can exit the housing 812. See FIG. 23. As shown, the inlet 824 and outlet 826 are confined within the stem 821 of the flow attachment member 820, where a flow separator 825 maintains flow through the inlet 824 and outlet 826 separate from each other.

Figure 23:
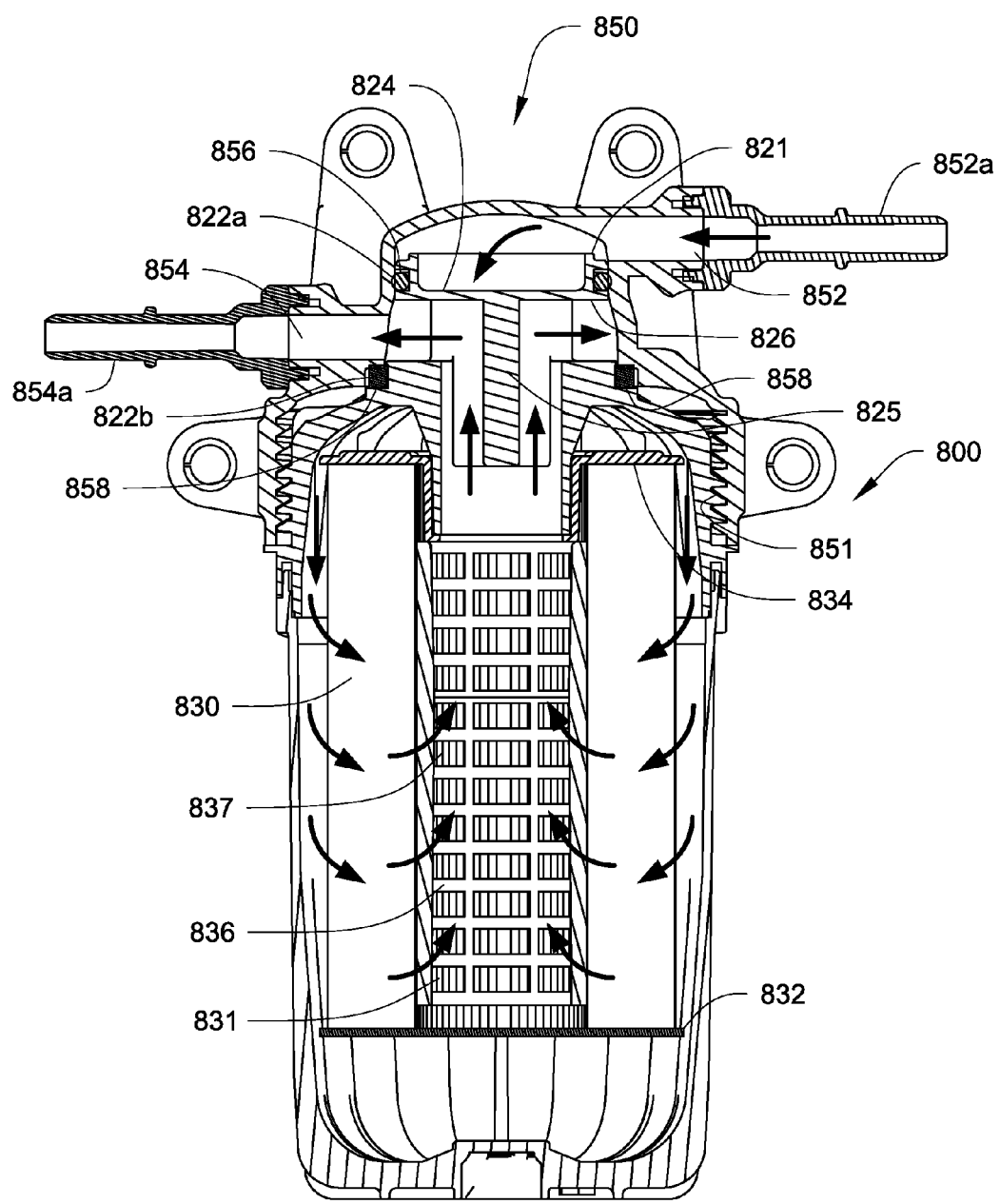
FIG. 23 illustrates a sectional view of the fluid filter of FIG. 21 and showing one embodiment of an attachment head connected to the fluid filter.

FIG. 23 also shows one embodiment of a filter head 850 for connecting the fluid filter 800 to a fluid system. Internal attachment feature 851 is disposed on an inner surface of the filter head 850, and is for engaging with the external attachment feature 814 of the fluid filter 800. As some examples, the internal attachment feature 851 may be constructed as a threaded configuration, bayonet, or the like. It will be appreciated that the internal attachment feature 851 is not limited so long as it may engage with the external attachment feature 814 of the fluid filter 800 to connect the fluid filter 800 to the filter head 850.

The filter head 850 includes an opening 852 for accessing the inlet 824 of the fluid filter 800. The filter head 850 also includes an opening 854 for accessing the outlet 826. Inlet line 852a connects to the opening 852 and outlet line 854a connects to the opening 854 to facilitate delivery of fluid to and from the fluid filter 800. In one embodiment shown in FIG. 23, the inlet line 852a and outlet line 854a are constructed with fitment ends that respectively mate with the openings 852, 854.

The filter head 850 further includes annular surfaces 856, 858 disposed on inner surfaces of the filter head. The annular surfaces 856, 858 engage with a sealing structure, which is further described hereinafter.

A groove is disposed about an outer surface of the stem 821. As shown, the groove is disposed circumferentially around the stem 821 proximate the end, and between the inlet 824 and the end of the stem 812. In one embodiment, the groove is configured as part of a sealing structure that can hold a sealing member 822a. As shown, the sealing member 822a is a resilient o-ring seal as one example.

Differently from the dual o-ring structure of fluid filter 100, the sealing structure of the fluid filter 800 includes one o-ring seal proximate the end of the stem 821, and a flange or face seal 822b disposed between the o-ring seal and the end of the housing 812. That is, the sealing structure configuration is similar to that of the fluid filter 700 in FIGS. 17-20. The flange or face seal member 822b may be a gasket member, such as a resilient square gasket disposed around the stem 821 and between inlet 824 and the external attachment feature 814. The face seal 822b is disposed on an outer annular shoulder of the stem 821. It will be appreciated that the seal member 822a and the seal member 822b may be interchangeable as desired and/or necessary. For example, the seal member 822b (or face seal) and annular shoulder may be disposed where the groove 822 and seal member 822a (or o-ring) are disposed. Likewise, the groove 822 and seal member 822a may be disposed where the seal member 822b and annular shoulder are disposed.

Turning back to the annular surfaces 856, 858 of the filter head, these annular surfaces 856, 858 respectively engage with the sealing members 822a, 822b. The annular surfaces and the sealing members respectively engage in a fluid tight seal, so as to maintain separate flow paths of the inlet 824 and outlet 826 when the fluid filter 800 is connected with the filter head 850.

It will be appreciated that the sealing structure configuration may be accomplished in a variety of ways as one of skill in the art can construct. For example, the sealing structure may be constructed of various configurations, including but not limited to a dual o-ring seal as in fluid filter 100, or one o-ring seal and one face sealing gasket as fluid filters 700, 800, or two face sealing gaskets (not shown). It further will be appreciated that o-rings and gasket seals may not be employed at all, such as where an interference fit between the stem and the filter head may accomplish a sufficient seal.

As with the other fluid filters described, the stem 821 is configured to provide a unique interface between the filtering element and a filter head. Such a unique interface would have a radially fluid tight seal at the stem 821, where flow into and out of the fluid filter 800 is localized by flow paths of the flow attachment member 820, which are accessed through the inlet 824 and outlet 826 and confined within the stem 821. As shown, the stem 821 is relatively disposed proximate, or substantially at a center region, and generally at the open end of the housing 812. The stem 821 is shown disposed away from proximity of the perimeter wall edges of the housing 812. As one example, the stem 821 substantially is centrally disposed about a longitudinally centered axis of the fluid filter 800.

The housing 812 and flow attachment member 820 are connected in a fluid tight seal at their outer walls. In one embodiment, the housing 812 and the flow attachment member 820 are connected via a spin weld configuration. As shown, the housing 812 includes grips 818 and the flow attachment member 820 includes grips 828. In one example, the grips 818, 828 are used to connect the housing 812 and the flow attachment member 820 through a spin-welding process. Grips 818 are disposed about an outer surface of the housing 812, while grips 828 are disposed on an outer surface of the flow attachment member 820 and radially outward from the stem 821. In one embodiment, the grips 818, 828 generally resemble sawtooth grips. It will be appreciated that that the grips are not limited to the specific structure shown, and may be modified as suitable and/or necessary. It will further be appreciated that the housing 812 and flow attachment member 820 may not be connected via spin-welding, but by some other approach, so long as the fluid tight seal is achieved between the housing 812 and flow attachment member 820.

As with the other fluid filters described, the filter media 830 is disposed within the housing 812. The filter media 830 is connected to an endplate 832 disposed proximate the end where the support members 816 are disposed. The filter media 830 is configured to connect with the flow attachment member 820 in a fluid tight seal through another endplate 834. The filter media 830 is connected with the endplate 834. As shown, the filter media 830 is disposed between endplates 832, 834. The endplate 834 is disposed at an opposite end from the endplate 832, where the endplate 834 can sealingly engage with the flow attachment member 820 in a fluid tight seal.

In one embodiment, the flow attachment member 820 and the endplate 834 are connected by a press fit. As one example, the flow separator 825 includes an outer annular surface that sealingly engages with an annular surface and shoulder of the endplate 834. Thus, the filter media 830 is connected to the flow attachment member 820 through a sealing engagement between the endplate 834 and the flow separator 825. In one embodiment, the filter media 830, the endplates 832, 834, and a center tube 836 (described in further detail below) together provide a cartridge assembly that is connected with the flow attachment member 820 in a fluid tight seal. It will be appreciated that the engagement between the endplate 834 and the flow attachment member 820 is not limited to the specific structure shown or to a press fit technique, and that other configurations may be employed for attaching the filter media 830 to the flow attachment member 820 as desired and/or necessary, so long as the fluid tight seal is accomplished.

As with the previous filter media described, the filter media 830 may be constructed in various configurations, such as but not limited to a spiral wrap, pleated, insert molded, stack disc, or flow through configurations, combinations of these, or the like. As shown in FIG. 23, the filter media 830 has a pleated configuration having folds 831. It will be appreciated that the material used for constructing the filter media 830 is not limited, so long as the filter media 830 will provide the desired filtering effect for its particular application.

Figure 24:
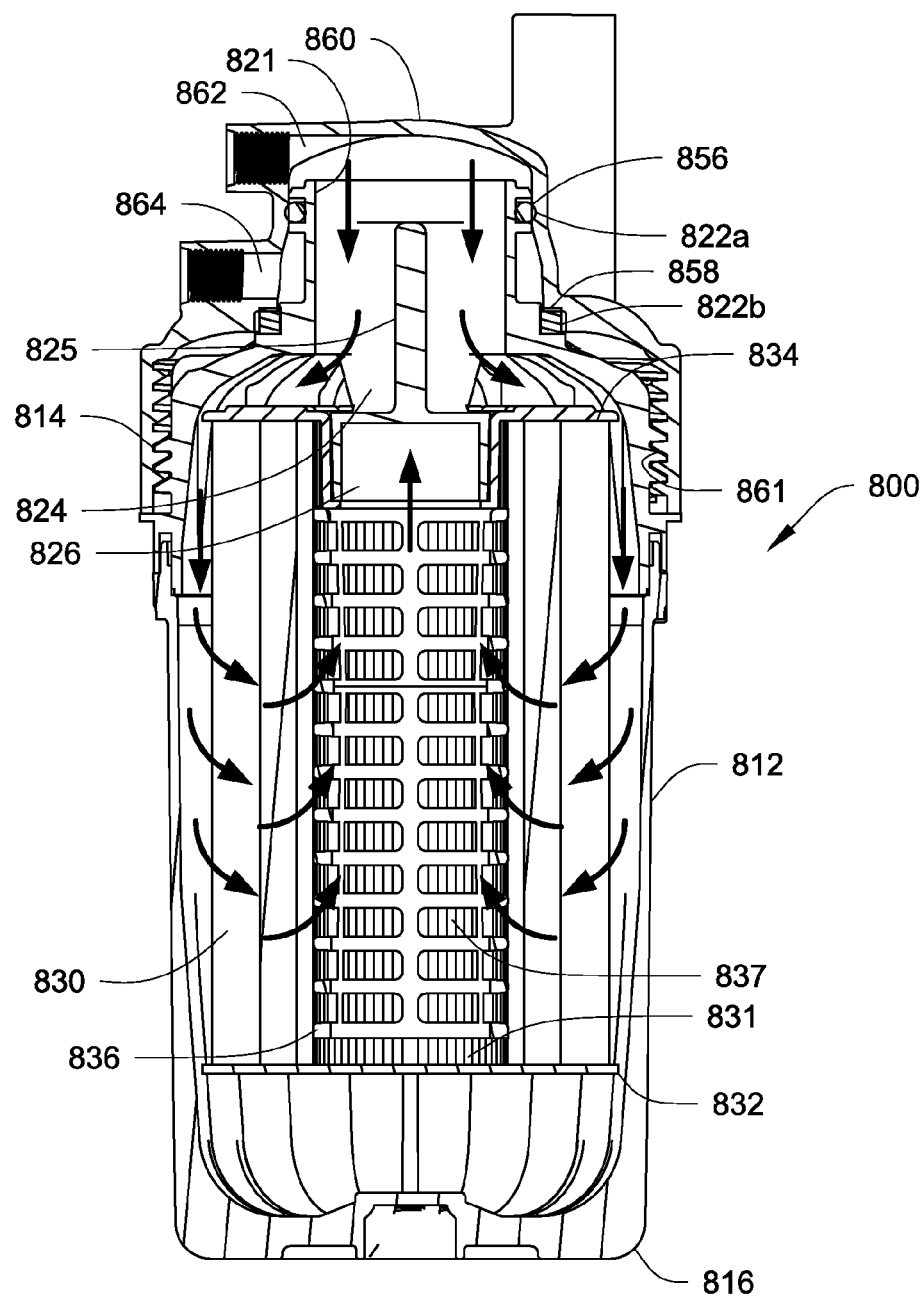
FIG. 24 illustrates another side sectional view of the fluid filter of FIG. 21 and showing another embodiment of an attachment head connected to the fluid filter.

In FIGS. 23 and 24, fluid flowing through the fluid filter 800 enters inlet 824 and exits outlet 826. The stem 821 contains both the inlet 824 and outlet 826, where the flow separator 825 maintains the separate flow into and out of the fluid filter 800. While the flow path of fluid is not completely shown in FIG. 23, it will be appreciated that fluid filter 800 employs a similar flow path construction as shown in FIGS. 9 and 10 of fluid filter 100. See also flow direction of FIG. 24. That is, fluid to be filtered enters the top end of the stem 821, and fluid that has been filtered exits through the side of the stem 821.

Fluid enters the housing 812 from the inlet 824 and travels to an outer side of the filter media 830 and to a space between the filter media 830 and the inner wall of the housing 812. Fluid can then be filtered through the filter media 830 to its inner side. A center tube 836 is disposed within the filter media 830. In one example, the center tube 836 cooperates with the filter media 830 in a concentric configuration, where a plurality of openings 837 allow for fluid filtered by the filter media 830 to enter the center tube 836 and exit through the outlet 826. As with the filter media 830, the center tube 836 is disposed between the endplates 832, 834, and can provide further structural support for the filter media 830.

FIG. 24 further illustrates another version of a filter head 860. The filter head is adaptable for connection with a fluid filter, such as fluid filter 800. The filter head 860 also includes an internal attachment feature 861 similar to internal attachment feature 851. Openings 862, 864 respectively communicate with the inlet 824 and the outlet 826. Differently from openings 852, 854, the openings 862, 864 include ends with internal threads. As one example, the internal threads are adapted for attaching to filtration system lines in a threaded engagement. The filter head also includes annular surfaces 866, 868 that engage with the sealing structure of the fluid filter (i.e. sealing members 822*a*, 822*b*), and are similar to the annular surfaces 856, 858.

The flow configuration of FIGS. 21-24 provide a generally radial fluid flow at first, where fluid is directed radially outward to a position between the filter media 830 and housing 812. As described, the flow attachment member 820 including its stem 821 and seal structure provide a separated incoming and outgoing flow that is localized away from edges of the housing. In such a configuration, an external seal often employed in spin-on filters between a nutplate and housing can be eliminated. Further, a nutplate in such designs may also be eliminated. Even further, the flow configuration provided by the flow attachment member 820 allows for a pre-filtering function over such standard spin-on type fluid filter. That is, when the fluid filter 800 is pre-filled through the center of the stem or the inlet 824, the fluid is filled on the unfiltered or "dirty side" of the fluid filter 800. Thus, the fluid must be pre-filtered before it can exit the fluid filter 800. Such a configuration is different from traditional spin-on type filters, where the fluid is pre-filled through the center, which is the outlet or the "clean side," and where the pre-filled fluid is allowed to immediately exit the fluid filter, rather than being filtered beforehand.

Turning back to FIG. 25, it will be appreciated that the inventive concepts of the fluid filters described herein may be retroactively used with existing fluid filter housings, and including features such as but not limited to the flow attachment member and seal configurations described. For example, by at least eliminating the nutplate 914 many of the flow attachment members described may be employed in such known spin-on filters. Further, the center tube may also be modified accordingly to accommodate any of the inventive flow attachment members described, and if necessary replaced entirely.

Figure 25:
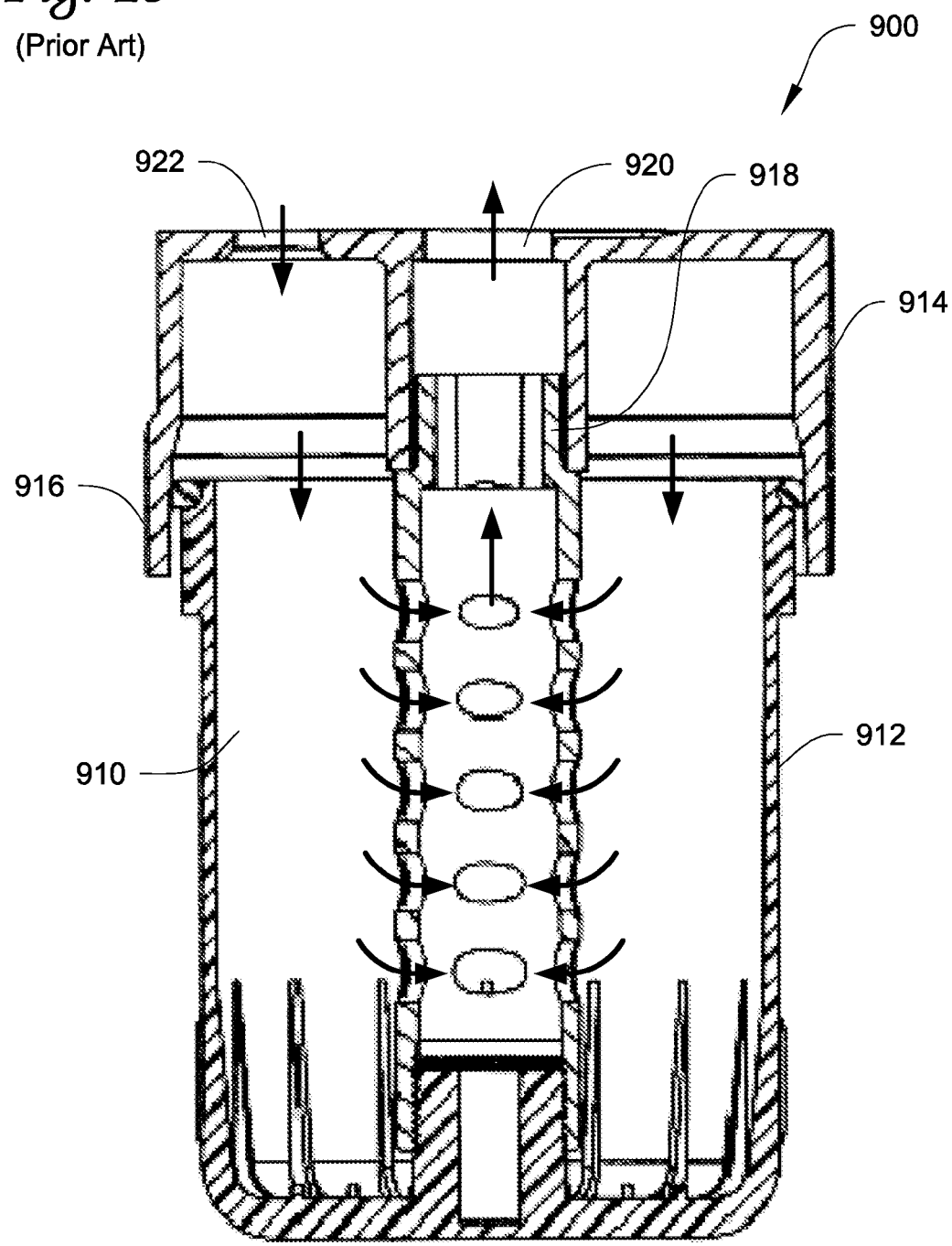
FIG. 25 illustrates a sectional view of a known fluid filter.
Figure 26:
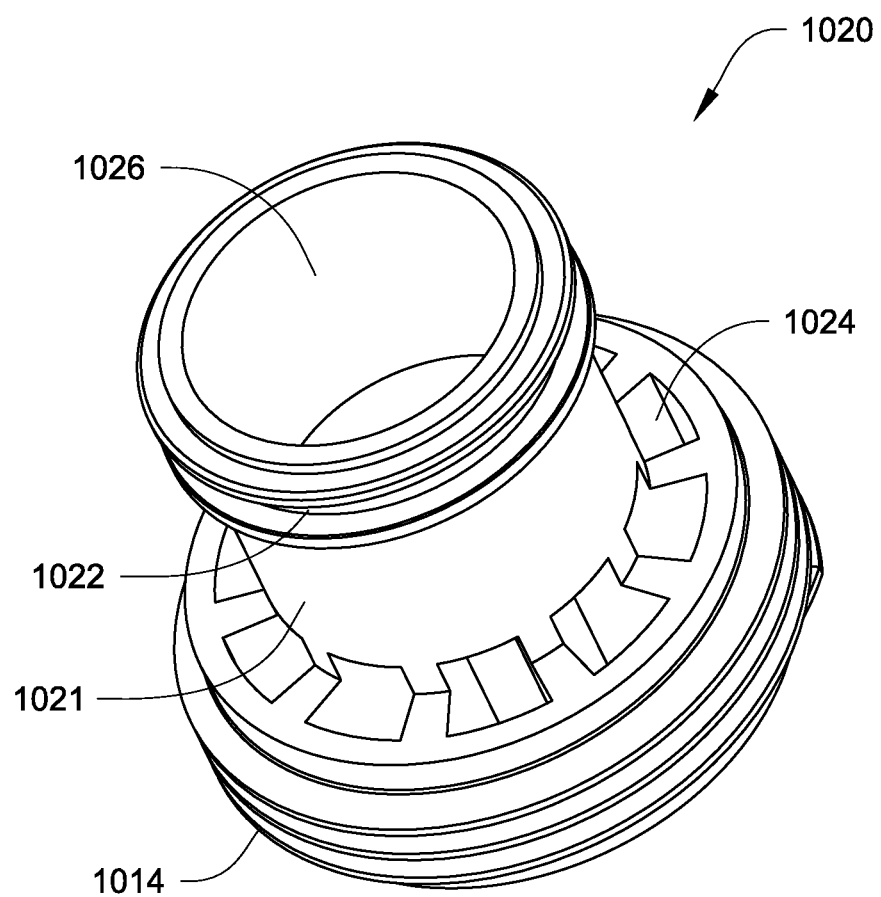
FIG. 26 illustrates a perspective view of an embodiment of a flow attachment member.
Figure 27:
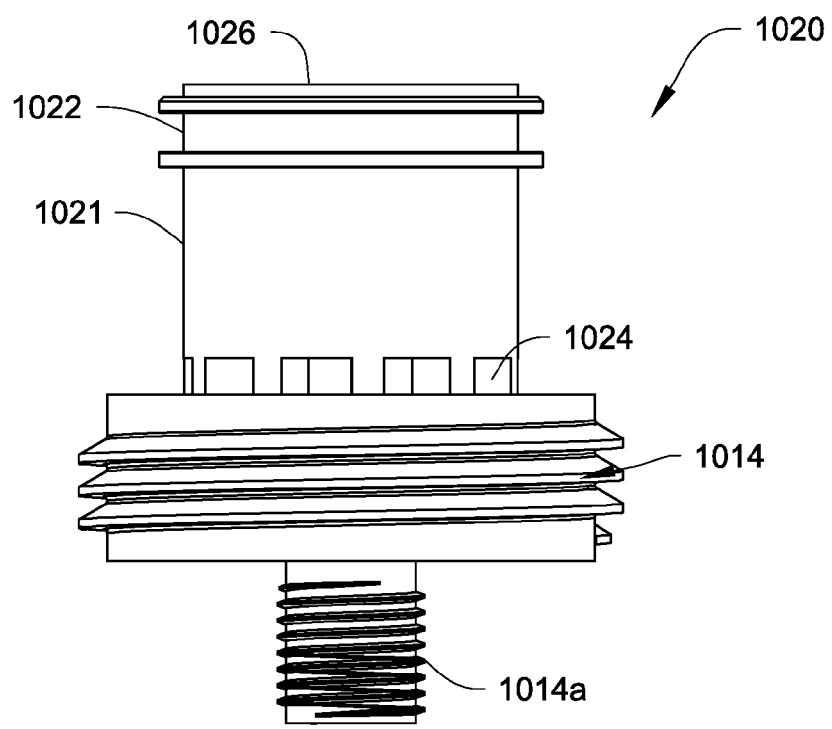
FIG. 27 illustrates a side view of the flow attachment member of FIG. 26.
Figure 28:
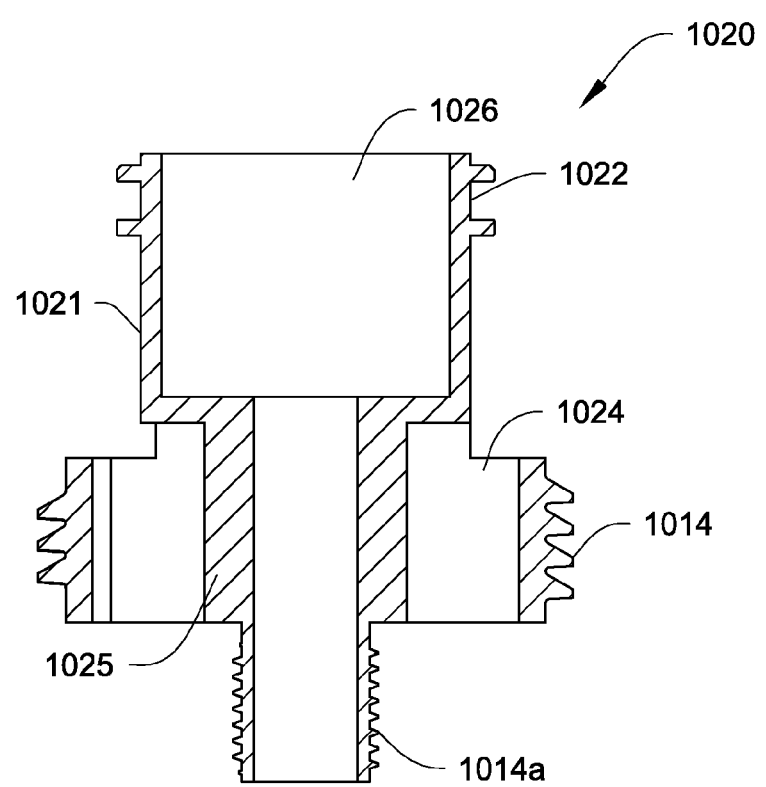
FIG. 28 illustrates a side sectional view of the flow attachment member of FIG. 26.

In yet another embodiment, the flow attachment member may be configured as a separate adapter structure, which can also be connected to a head of an already existing fluid filter. As one example, the flow attachment member can be configured as an adapter for use with traditional spin-on filters, such as shown in FIG. 25, and without removing the existing nutplate. Such a flow attachment member would connect to and seal the separate flow openings of the existing filter's nutplate. More specifically, the flow attachment member would direct unfiltered fluid and filtered fluid through its separating structure. In such a configuration, fluid flow can be re-routed through the flow attachment member, while allowing usual flow within a standard style filter (e.g. spin-on filter).

FIGS. 26-30 illustrate another embodiment of a flow attachment member 1020. The flow attachment member 1020 includes similar flow channel and seal structure features as the above-described flow attachment members. It will be appreciated that many of the inventive principles of the above-described flow attachment members may be suitably incorporated in the flow attachment member 1020.

The flow attachment member 1020 includes a stem 1021 having an inlet 1024 and outlet 1026. The inlet 1024 and outlet 1026 are disposed on the stem 1021, where the stem 1021 includes a separating structure 1025 to maintain the separate incoming and outgoing flow through the flow attachment member 1020. As with other flow attachment members described, the flow attachment member 1020 localizes incoming and out going flow within the stem 1021, such as when the flow attachment member is connected to a fluid filter, for example a traditional spin-on type. A groove 1022 is disposed proximate the outlet 1026. The groove 1022 may house an o-ring or a gasket seal (not shown), and provides the necessary sealing structure to further facilitate localizing fluid flow, and further enjoys the sealing structure benefits as those flow attachment members described above.

Figure 29:
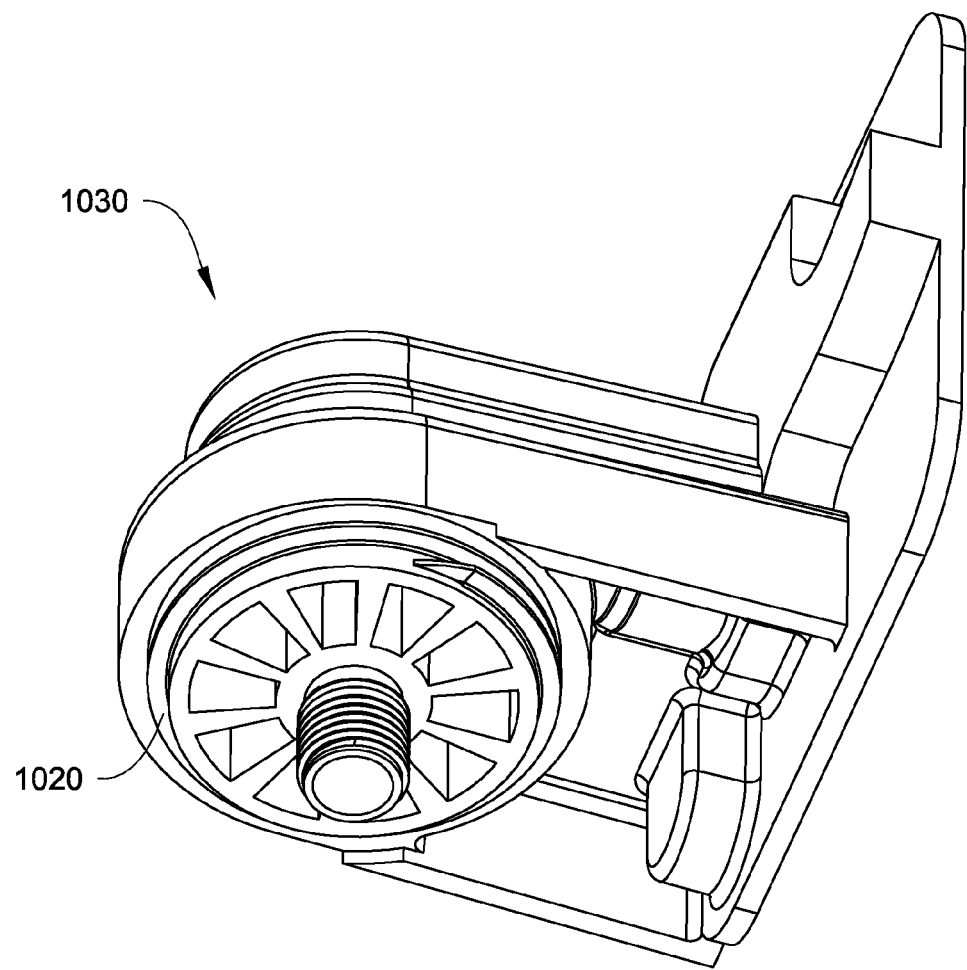
FIG. 29 illustrates a perspective view of the flow attachment member of FIG. 26.
Figure 30:
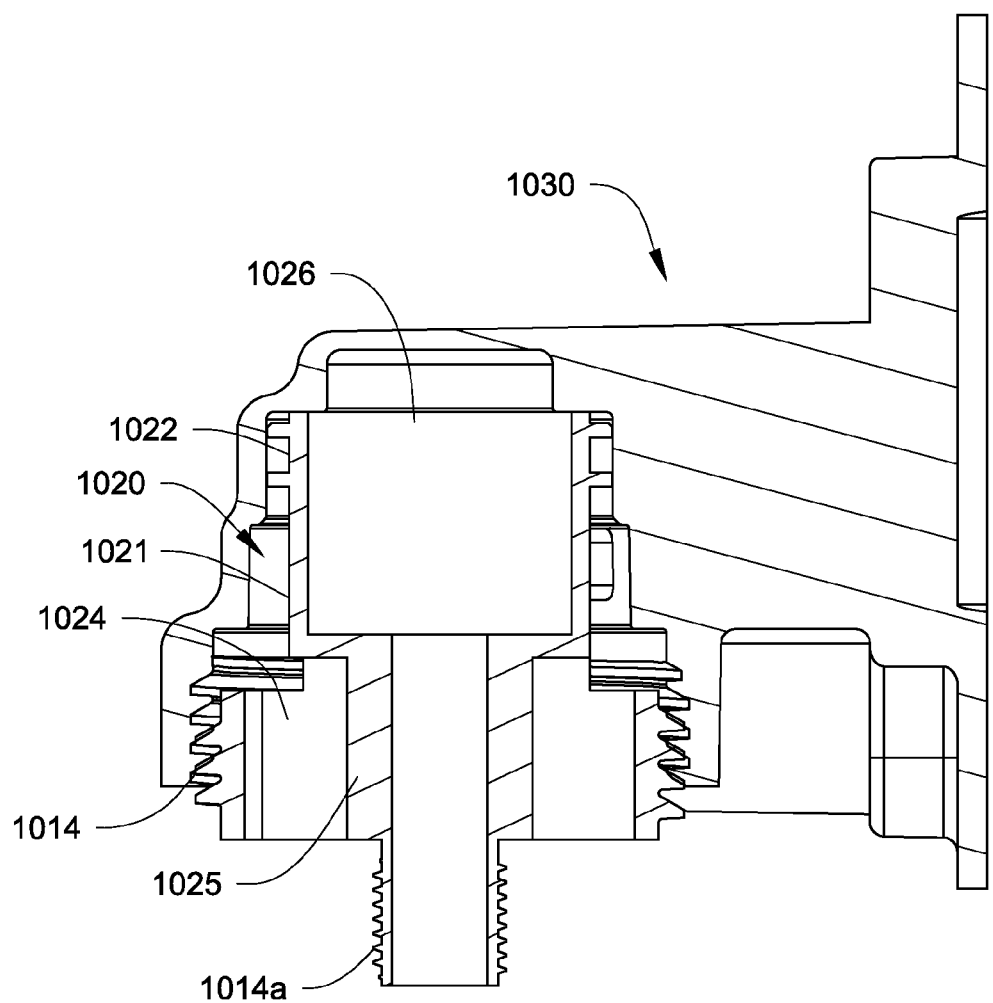
FIG. 30 illustrates a side sectional view of the flow attachment member of FIG. 26.

The flow attachment member 1020 includes external attachment features 1014, 1014a. The external attachment features 1014 are useful for respectively attaching the flow attachment member 1020 to a component 1030 of a filtration system and to a fluid filter (e.g. spin-on filter of FIG. 25). As shown in FIGS. 29 and 30, the external attachment feature 1014 can connect to the component 1030 of a filtration system, and the external attachment feature 1014a is available to connect to a fluid filter. As one example only, the external attachment feature 1014 may connect with opening 920 of the spin-on filter 900 of FIG. 25. In such a configuration, the outlet 1026 communicates with opening 920 to allow fluid to exit the fluid filter 900, and inlet 1024 communicates with opening(s) 922 to allow fluid to enter the fluid filter 900 for filtering.

The external attachment features 1014, 1014a may be a threaded configuration, bayonet, or the like. It will be appreciated that the external attachment features 1014, 1014a are not limited to the specific structure shown, and may be modified using various structures as may be suitable and/or necessary.

The fluid filters described can provide many benefits such as allowing for a more clean service, since flow into and out of the fluid filter is localized within the flow attachment member. As a result, a filter can be provided that is more environment friendly and is more pleasing to customers and users. The fluid filter described herein also can substantially prevent or at least confine leakage, if any, to a localized area and away from proximity of edges of the housing, since a seal structure is provided on the flow attachment member. Thus, additional external and internal seals can be eliminated, where a fluid filter can be provided that is relatively inexpensive, reliable, and has fewer parts. Further, the flow attachment can eliminate the need for a nutplate as employed in many fluid filters, such as typically employed in spin-on type fluid filters, which substantially reduces the cost associated with the filter as well as enables the device to consist of mostly non-metallic components. The housing itself may also be made of metallic or plastic material and have an embedded or press-fit cartridge style filter media pack. The filter media pack can be one unit which is attached to the housing via spin-weld, ultrasonic, adhesive, etc. Further, variations of the filter media design can be considered, where two different types of filter media that could be used for fuel water separation. The flow attachment can provide a unique head and filter interface that may give OEM improved aftermarket business.

More specifically, the filters described can be produced as a fully disposable molded plastic filter without the inclusion of a nutplate. Further, the flow attachment member may be molded or formed as one single component (as opposed to multiple parts to create the separate flow channels.) The inlet and outlet flow are channeled generally through the center portion of the filter housing. The protrusion of the channels may be utilized to operate a valve for fluid shut-off within the filter head during service. The aforementioned filters can allow the filter to seal radially against the head's inlet and outlet while maintaining a leak free environment. As noted, leakage during removal can be confined to the flow attachment structure and seepage around the filter edges can be substantially eliminated.

In addition, as the fluid flow can be localized, the need for an outer seal can be eliminated, thus creating a unique encapsulated filtration environment. As a result, traditional outer o-ring seal and square-cut gasket can be eliminated in favor of a simplified stem seal configuration. The ability to create a unique attachment method is increased substantially by confining the fluid flow within the sealed portion of the filter.

The separated but confined flow design can be integrated within existing user-friendly filter product architecture to utilize the media cartridges and shell design as well as be manufactured on the same assembly line.

Even further, the flow attachment member can provide a benefit of pre-filling a fluid filter in the unfiltered containment region, such as the "dirty side." The flow attachment member disclosed herein utilizes a flow redirection concept through the flow attachment member that effectively diverts pre-filled fluid through the filtration media before it can enter the fuel system. That is, the flow attachment member described herein can allow for a pre-filtering function of the pre-filled fluid before the fluid is allowed to enter exit the fluid filter. Such a flow redirection can be particularly helpful to newer high-pressure common rail fuel systems that require fine particle filtration.

Filter Head Design

FIGS. 31-37 show an improved filter head 1100 having a shell 1110, mount 1120, and inlet and outlet fittings 1102, 1104. Generally, the shell 1110, mount 1120, and fittings 1102, 1104 are integrally formed, constructed, or otherwise built together into the overall filter head design. As one preferred embodiment, the filter head 1100 is a composite design, such as for example a plastic material, where the fittings 1102, 1104 are integrally molded with the shell 1110 and mount 1120 as one single component. As one example only, the material of the filter head 1100 is Nylon 66 with a 30% glass fill. It will be appreciated, however, that the particular material is meant to be non-limiting, and that other materials may be employed that are suitable and appropriate. The fittings 1102, 1104 connect to fluid lines of a protected system, such as a fluid system of an engine (e.g. lube, fuel, etc.), and are configured to allow fluid entry and exit from the shell and filter.

Figure 34:
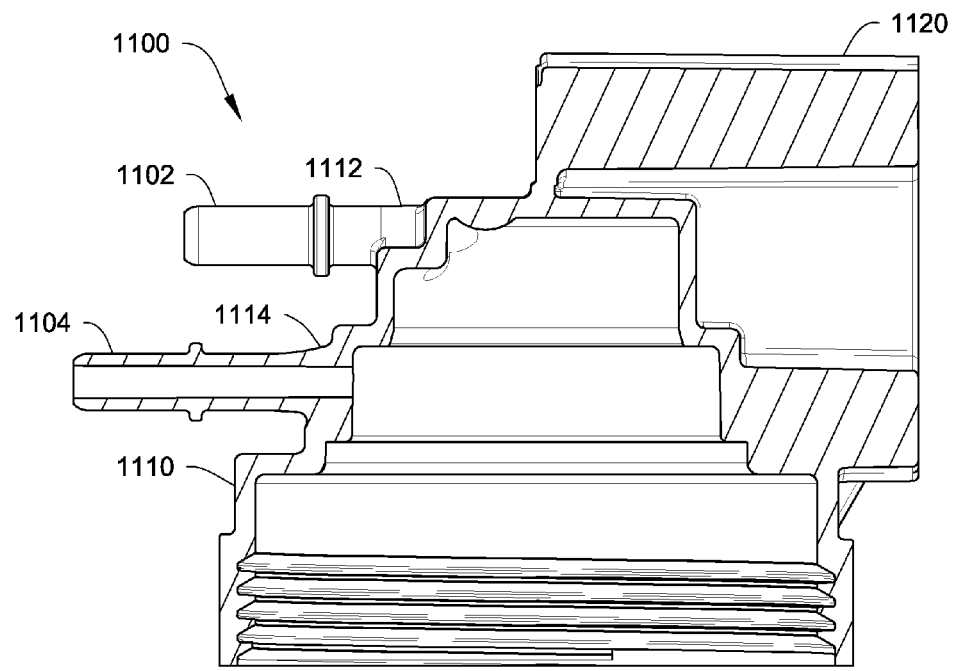
FIG. 34 is a side sectional view of the filter head of FIG. 31.
Figure 35:
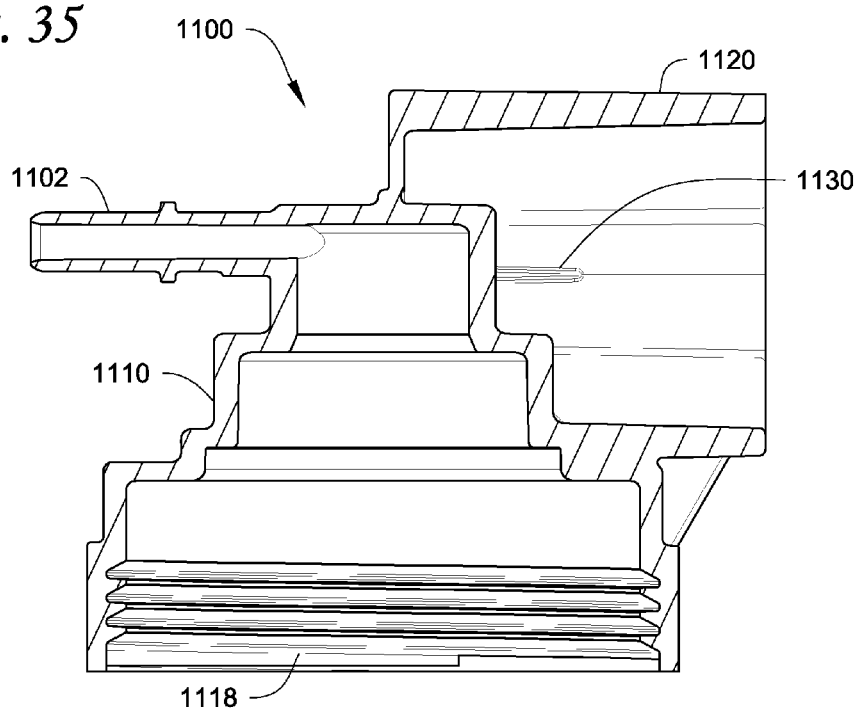
FIG. 35 is a partial side sectional view of the filter head of FIG. 31.

With reference to the shell 1110 and mount 1120, the shell 1110 has an inner and outer wall structure that can cover the area of fluid flow (inlet/outlet) of a filter. For example, the inner and outer wall structure is configured to cover fluid filters, such as but not limited to the fluid filters shown in FIGS. 1-10 and 17-24, or configured to cover a filter using the flow attachment member shown in FIGS. 26-30. That is, the shell as shown is constructed to accommodate the fluid filters described herein, where the fittings 1102, 1104 are in fluid communication with the inlet/outlet construction of the filter. The shell is also configured with an inner wall structure that can seal to the fluid filter, so as to fluidly separate the inlet and outlet fittings 1102, 1104. However, it will be appreciated that the wall structure and shape of the shell 1110 can be modified as appropriate to accommodate fluid filters that have a different outer profile than the filters shown herein. As best shown in FIGS. 34 and 35, the shell has an inner thread 1118 that can engage a thread on a fluid filter (e.g. fluid filters shown in FIGS. 1-10 and 17-24 or a filter using the flow attachment member shown in FIGS. 36-30).

As further described below, the filter head 1100 also has an inner configuration that maintains structural integrity, such as maintaining a required natural frequency (e.g. about 175 Hz or higher), while reducing the filter head weight. By natural frequency, components such as those employed in engine systems will tend to excite or undergo vibration or other stress during operation. Natural frequency refers to a threshold at which such a component may be excited.

Figure 32:
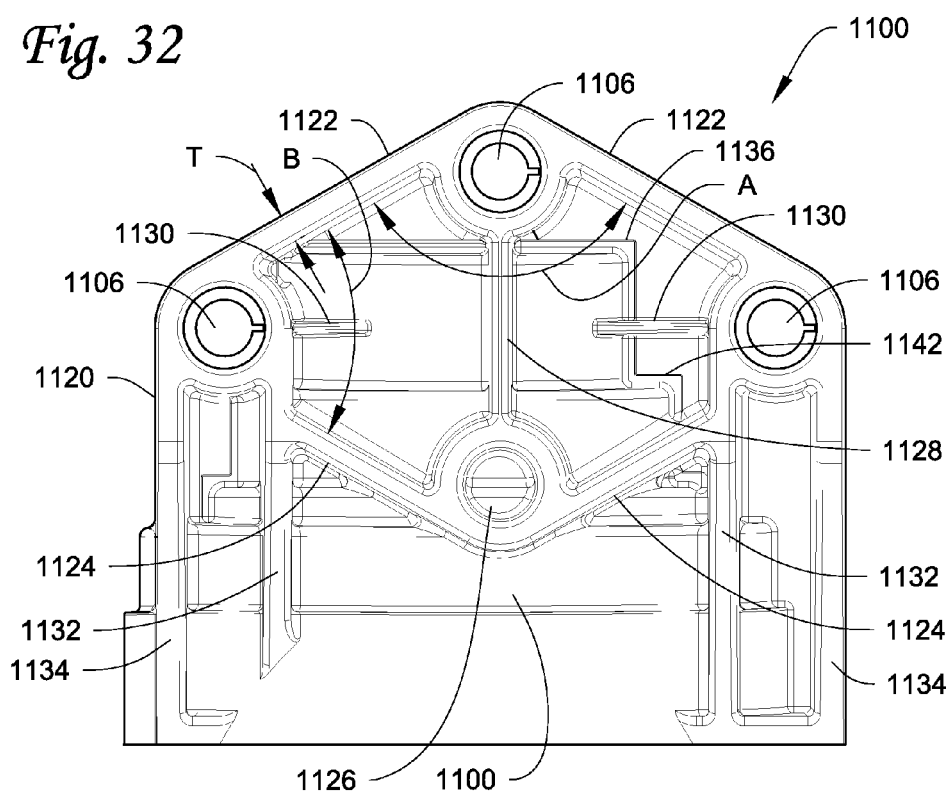
FIG. 32 is a rear side view of the filter head of FIG. 31.
Figure 33:
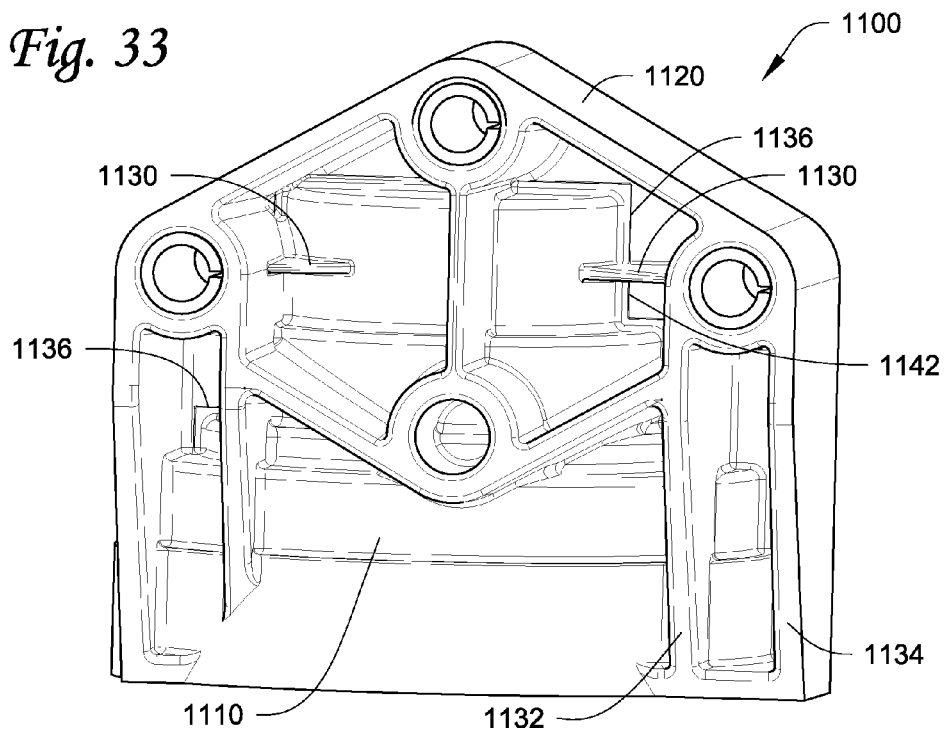
FIG. 33 is a perspective rear side view of the filter head of FIG. 31.
Figure 36A:
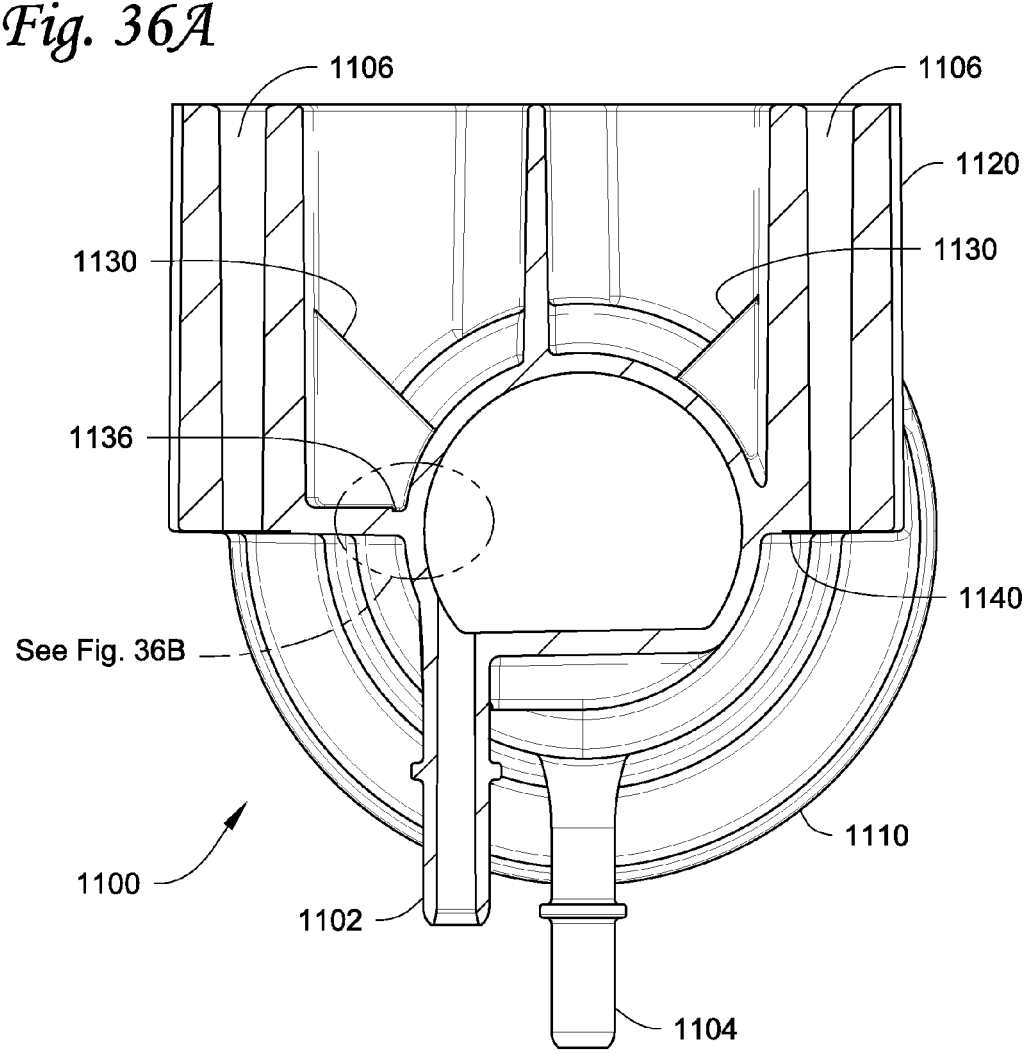
FIG. 36A is a top partial sectional view of the filter head of FIG. 31.
Figure 36B:
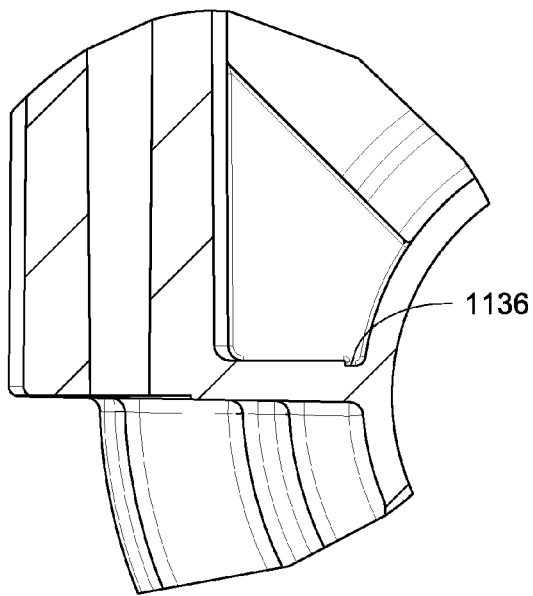
FIG. 36B is a sectional view detail shown in FIG. 36A.

With reference to the mount 1120, FIGS. 32-33 and FIGS. 36A and B show an embodiment of various components and structures that can contribute to the structural integrity of the filter head, such as when it is connected to a fluid filter and engine. As shown, the mount 1120 includes a rib support and wall structure arrangement that allow for the mount to be a relatively open structure on the inside. Bolt holes 1106 are provided for connecting/disconnecting the filter head 1100 to another equipment, for example, to an engine (not shown). As shown, the bolt holes 1106 are supported by upper rib supports 1122. In one embodiment, the upper rib supports 1122 are disposed between the bolt holes 1106 and connect them at the upper portion of the mount 1120.

As one example only, three bolt holes 1106 are shown. It will be appreciated, however, that more or less bolt holes may be employed where appropriate, desired, and/or necessary. In some preferred embodiments, the bolt holes 1106 are the same length, and substantially extend within the mount 1120 from end to end.

In the embodiment shown, the upper rib supports 1122 also form part of the upper wall structure of the mount 1120, further described below.

Lower rib supports 1124 support the bolt holes 1106 at the lower portion of the mount 1120. In one embodiment, the lower rib supports 1124 are disposed between the bolt holes 1106 and connect them through a reinforcing junction 1126 at the lower portion of the mount 1120. In one example only, the reinforcing junction 1126 is for instance a circular structural element.

In the example shown, the upper and lower rib supports 1122, 1124 are constructed and arranged in a substantially diamond-like or rhombus-like shape. In some embodiments, each of the support ribs 1122, 1124 may have a thickness T ranging from about 4 to about 4.5 mm. In one embodiment, the bolt holes 1106 are generally disposed at vertices of the arrangement resembling the diamond-like shape, for example at top and side vertices, where the reinforcing structure 1126 is disposed at the bottom vertex opposite the top vertex. In some embodiments, the relative angle A at the top and bottom vertices is about 120° and the angle B at the side vertices is about 60°. It will be appreciated that the particular configuration as shown is non-limiting as other modifications may be employed as appropriate, desired, and/or necessary.

In the embodiment shown, a vertical rib 1128 is disposed between the top bolt hole 1106 and the reinforcing structure 1126. The vertical rib 1128 provides added reinforcement and support to the rib supports 1122, 1124 and reinforcing structure 1126.

With further reference to the inner configuration of the filter head 1100, horizontal ribs 1130 may be employed as appropriate to further secure and support the mount 1120 to the shell 1110. The horizontal ribs 1130 are best shown in FIGS. 32-33 and FIG. 36A.

In the embodiment shown, the mount 1120 in some examples has additional inner and outer vertical ribs 1132, 1134. FIGS. 32 and 33 show the inner and outer vertical ribs 1132, 1134 extending downward from the locations of the side or lower bolt holes 1106. As shown, the inner and outer vertical ribs 1132, 1134 extend along a majority of the shell 1110 height. In some embodiments, the ribs 1132, 1134 taper or chamfer toward the shell 1110 in the downward direction, such as shown in FIG. 33. The vertical rib structure 1132, 1134 further adds to maintaining a high natural frequency (e.g. about 175 Hz or higher). The location of the vertical ribs can help to improve the natural frequency, while eliminating the need for horizontal ribs. For example, the fundamental vibrational mode is perpendicular to the mounting plane. A vertical rib (or ribs) located in various geometries with respect to the bolt holes can add stabilization with respect to that vibrational mode. The vertical ribs located in the position as shown, for example, can help to distribute mounting rigidity through the filter head. Horizontal ribs would have a minimal effect in this regard, and may lead to the accumulation of debris on the head in these horizontal rib locations. It will be appreciated that geometries other than the vertical ribs shown may also achieve the effect maximizing natural frequency while minimizing overall component mass. For example, these include radial ribs extending from the bolt holes and grid patterns created from a combination of vertical and horizontal ribs.

With reference to FIGS. 32-33 and 36A-B, the filter head 1100 construction can help with the reduction of sink marks at sealing areas where the filter head 1100 contacts a filter. In the embodiment shown for example, the mount 1120 includes reduced wall thickness at areas where the mount 1120 is connected to the shell 1110. For example, FIGS. 36A and 36B respectively show a top partial sectional view of the filter head and a sectional view of the reduced wall thickness detail in FIG. 36A. As shown, the mount 1120 has a sidewall 1140 that extends perpendicularly relative to the direction that the bolt holes 1106 extend. The sidewall has a rim 1142 that substantially contours the outer surface of the shell 1110 as shown in FIGS. 32 and 33. The rim 1142 includes a reduced wall thickness and is connected to the outer of the shell to form a groove 1136. As shown, the groove 1136 extends about the sidewall that substantially contours the shell 1110. This reduced wall thickness or groove 1136 (e.g. thinner wall) helps to reduce formation of sink marks on the seals of the filter (e.g. at seals 722a and 722b of fluid filter 700), which may be imposed upon by the wall structure of the filter head 1100. In one example only, the reduced wall thickness is less than 4.0 mm, and is sometimes approximately 3.0 mm. Generally, the reduced wall thickness is relatively less than the wall and rib structure of remaining portions of the shell 1110 and mount 1120.

With reference to the outer configuration of the filter head 1100, the construction of the mount 1120 and fittings 1102, 1104 help to improve cleanliness, for example by minimizing leakage, and help to improve fluid flow, for example by minimizing initial restrictions at the inlet and outlet.

Figure 31:
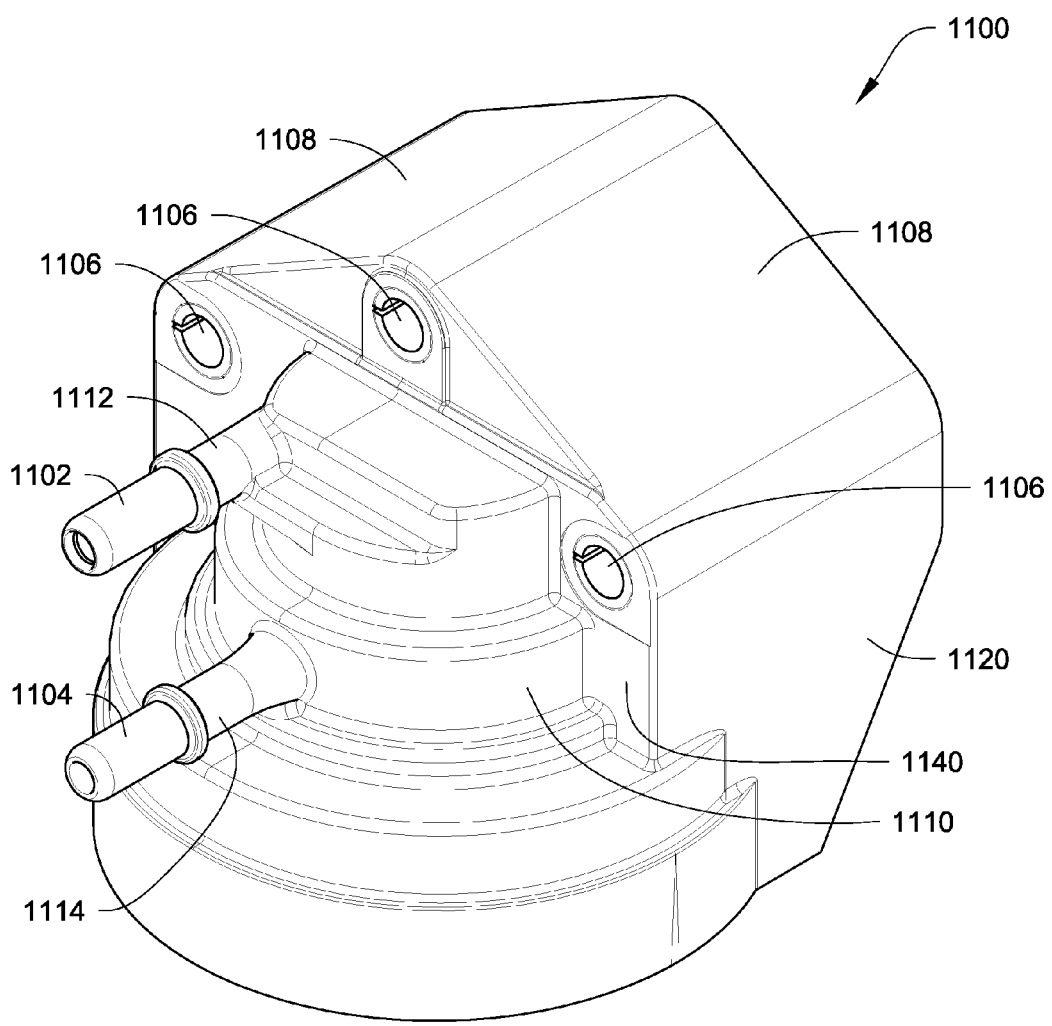
FIG. 31 is a perspective view of an embodiment of a filter head.

With reference to FIGS. 31-33, the outer construction of the mount 1120 provides a sloping surface 1108 that helps maintain cleanliness of the filter head. For example, the sloping surface 1108 allows for run off of material, such as dirt, which may fall onto the filter head, thereby helping to reduce buildup on the filter head 1100. In the example shown, the sloping surface 1108 is shaped so that the outer part of the mount 1120 is formed as an A-frame bracket. The A-frame may be used, for example, when the inner configuration of the mount 1120 is a diamond-shape, which can make for easier mold manufacture, while maintaining the structural integrity and reduction in weight improvements described above.

With further reference to the fittings 1102, 1104, leakage potential between the fittings 1102, 1104 and shell 1110 of the filter head 1100 can be eliminated, since the fittings are constructed as part of the overall design of the filter head 1100 (e.g. integrally molded as one piece). In some embodiments, the fittings 1102, 1104 can be formed to be positioned and located, so that they may reduce tangential and turbulent flow, as well as initial restriction of the fluid flow. For example, FIG. 36A illustrates an example of such positioning. As shown, fitting 1102 was moved closer to the central axis of the filter head 1100 to reduce tangential and turbulent flow. Through location and positioning of the fittings 1102, 1104, a whirlpool effect can be avoided in the fluid flow over an arrangement where the fittings are tangentially positioned with respect to the shell. Such a whirlpool or "swirling" type of flow naturally increases overall restriction in any design. Moving any or both of the inlet/outlet closer to the center can produce a flow that is more linear to the filter inlet, so as to minimize the whirlpool effect and overall restriction which is desired.

In some embodiments, the fittings 1102, 1104 can be constructed or formed to taper 1112, 1114 from a larger diameter at the end connected to the shell 1110 to a smaller diameter toward the opposite end or end connectable to a fluid line (see e.g. FIGS. 34 and 35). It will be appreciated that the fittings of the filter head may be designed to meet industry standards as necessary, such as for example, SAE standards including SAE J2044.

Figure 37:
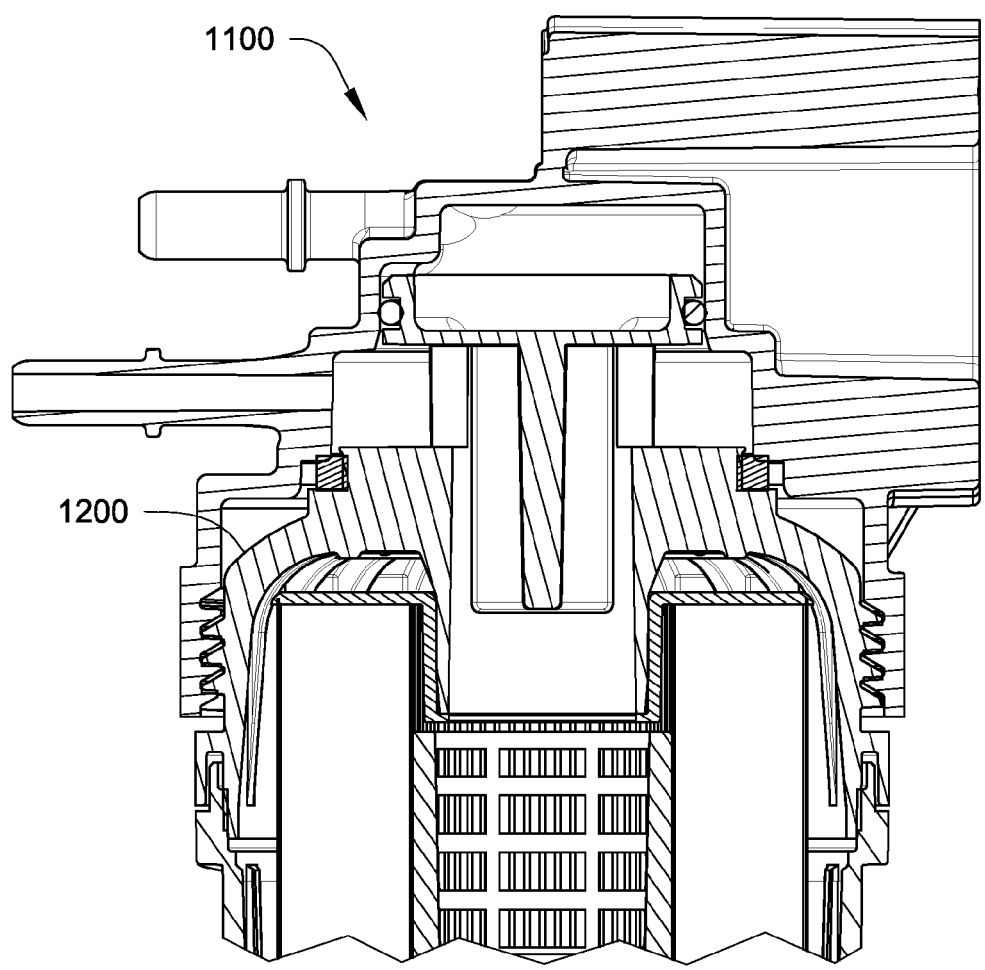
FIG. 37 is a sectional view of the filter head of FIG. 31 connected to a filter.

FIG. 37 is a sectional view of the filter head 1100 connected to a filter 1200 similar to those described above. As above, the filter head 1100 in some embodiments is configured to cover fluid filters, such as but not limited to the filters shown in FIGS. 1-10 and 17-24, or configured to cover a filter using the flow attachment member shown in FIGS. 36-30.

The filter head described herein can provide various advantages, among others, such as minimizing leakage potential, reduced weight of the overall component, maintenance of high natural frequency, and improved cleanliness overall. The one-piece design of the filter head including the fittings can help achieve such advantages.

The invention may be embodied in other forms without departing from the spirit or novel characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

We claim:

1. A filter head comprising:
   a shell configured to cover and seal with an area of fluid flow of a fluid filter;
   a mount connected to the shell;
   an inlet configured to allow entry of fluid into the shell; and
   an outlet configured to allow exit of fluid from the shell,
   wherein the mount includes a sidewall and ribs, the mount defining a plurality of openings,
   the ribs extending relative to the sidewall of the mount,
   the plurality of openings configured to allow the filter head to mount onto another piece of equipment, the ribs configured to provide structural support, the sidewall extending from an outer wall structure of the shell,
   the ribs including upper ribs and lower ribs,
   the upper ribs directly connect to and extend between the plurality of openings,
   the plurality of openings and the ribs define an interior hollow region of the mount, wherein the plurality of openings and the upper ribs extend from a first end of the hollow region to a second end of the hollow region, the first end of the hollow region being enclosed by at least one of the sidewall of the mount and/or a portion of the outer wall structure of the shell,
   the inlet and the outlet extend away from the fluid filter in an opposite direction with respect to the ribs, and
   wherein the shell, the mount, the inlet and the outlet are integrally molded from a composite material as a one-piece component.

2. The filter head of claim 1, wherein the shell has an inner thread.

3. The filter head of claim 1, wherein the shell has an inner wall structure configured to seal with the area of fluid flow of the fluid filter to fluidly separate the inlet and the outlet.

4. The filter head of claim 1, wherein the mount further comprises at least one of vertical ribs and/or radial ribs positioned such that the natural frequency is at least 175 Hz.

5. The filter head of claim 1, wherein the plurality of openings are bolt holes and the upper ribs and lower ribs have an arrangement that has a diamond shape that is oriented such that one of the bolt holes is positioned generally at a top vertex and two of the bolt holes are positioned generally at two side vertices of the arrangement.

6. The filter head of claim 5, wherein the mount further comprises a reinforcing structure positioned generally at a bottom vertex of the arrangement, the reinforcing structure is connected to the lower ribs.

7. The filter head of claim 6, wherein the mount further comprises a vertical rib connected between the top and bottom vertices of the arrangement.

8. The filter head of claim 1, wherein the mount comprises an outer sloped surface.

9. The filter head of claim 8, wherein the outer sloped surface is generally an A-frame.

10. The filter head of claim 1, wherein the mount further comprises inner and outer vertical ribs that extend from at least of one the plurality of openings and along a majority of a height of the shell, the inner and outer vertical ribs are respectively disposed at an inner position and an outer position with respect to a vertical center line of the mount.

11. The filter head of claim 10, wherein the inner and outer vertical ribs taper toward the shell.

12. The filter head of claim 1, wherein a first portion of the sidewall of the mount includes a rim that connects an outer surface of the outer wall structure of the shell to a second portion of the mount and forms a groove on the sidewall, wherein a thickness of the rim is less than a thickness of the outer wall structure of the shell and a thickness of the second portion of the sidewall of the mount.

13. The filter head of claim 12, wherein the groove substantially contours the outer surface of the outer wall structure of the shell where the rim connects with the shell.

14. The filter head of claim 12, wherein the reduced wall thickness is approximately 3.0 mm and less than 4.0 mm.

15. The filter head of claim 1, wherein the mount further comprises horizontal ribs that connect the mount to the shell.

16. The filter head of claim 1, wherein the inlet and the outlet have a tapered construction of larger diameter at one end from the shell to a smaller diameter at an opposite end.

17. The filter head of claim 1, wherein the inlet and the outlet are positioned to reduce initial restriction of fluid entering and exiting the filter head.

18. A filter assembly comprising:
1) a fluid filter that includes:
a housing having a filter cartridge disposed therein, the filter cartridge containing a filter media; and
a cap configured to communicate fluid to be filtered to the filter media, and configured to communicate fluid filtered by the filter media out of the fluid filter, the cap comprises a stem and a flow separating structure configured to localize fluid flow both into and out of the fluid filter, the stem and the flow separating structure being molded as a single component, and a seal structure disposed about an outer surface of the stem, the seal structure configured to substantially prevent or confine leakage from the cap; and
2) a filter head that includes:
a shell connectable to the fluid filter, the shell is configured to cover and seal with an area of fluid flow of the fluid filter;
an inlet configured to allow entry of fluid into the shell;
an outlet configured to allow exit of fluid from the shell; and
a mount connected to the shell, the mount includes a sidewall and ribs, the mount defining a plurality of openings,
the plurality of openings are configured to allow the filter head to mount onto another piece of equipment, the sidewall extend from an outer wall structure of the shell,
the ribs including upper ribs and lower ribs,
the upper ribs directly connect to and extend between the plurality of openings,
the plurality of openings and the ribs define an interior hollow region of the mount, wherein the plurality of openings and the upper ribs extend from a first end of the hollow region to a second end of the hollow region, the first end of the hollow region being enclosed by at least one of the sidewall of the mount and/or a portion of the outer wall structure of the shell,
the inlet and the outlet extend away from the fluid filter in an opposite direction with respect to the ribs,
wherein the ribs extend relative to the sidewall the sidewall of the mount and are configured to provide structural support, and
wherein the shell, the mount, the inlet and the outlet are integrally molded from a composite material as a one-piece component.

19. The filter head of claim 1, wherein the second end of the interior hollow region is open.

20. The filter assembly of claim 18, wherein the second end of the interior hollow region is open.

21. The filter assembly of claim 18, wherein the outer wall structure of the shell fluidly separates the interior hollow region of the mount from an interior region of the shell.

22. The filter head according to claim 1, wherein the outer wall structure of the shell fluidly separates the interior hollow region of the mount from an interior region of the shell.

23. A filter head comprising:
a shell configured to cover and seal with an area of fluid flow of a fluid filter;
a mount connected to the shell;
an inlet configured to allow entry of fluid into the shell; and
an outlet configured to allow exit of fluid from the shell,
wherein the mount includes a sidewall and ribs, the mount defining a plurality of openings,
the ribs extending relative to the sidewall of the mount,
the plurality of openings configured to allow the filter head to mount onto another piece of equipment, the sidewall extending from an outer wall structure of the shell,
the ribs including upper ribs and lower ribs,
the upper ribs directly connect to and extend between the plurality of openings,
the plurality of openings and the ribs define an interior hollow region of the mount, wherein the plurality of openings and the upper ribs extend from a first end of the hollow region to a second end of the hollow region, the first end of the hollow region being enclosed by at least one of the sidewall of the mount and/or a portion of the outer wall structure of the shell,
the inlet and the outlet extend away from the fluid filter in an opposite direction with respect to the ribs,
wherein the outer wall structure of the shell fluidly separates the interior hollow region of the mount from an interior region of the shell, and
wherein the shell, the mount, the inlet, and the outlet are integrally molded from a composite material as a one-piece component.

24. A filter assembly comprising:
1) a fluid filter that includes:
a housing having a filter cartridge disposed therein, the filter cartridge containing a filter media; and
a cap configured to communicate fluid to be filtered to the filter media, and configured to communicate fluid filtered by the filter media out of the fluid filter, the cap comprises a stem and a flow separating structure configured to localize fluid flow both into and out of the fluid filter, the stem and the flow separating structure being molded as a single component, and a seal structure disposed about an outer surface of the stem, the seal structure configured to substantially prevent or confine leakage from the cap; and 2) a filter head that includes:

a shell connectable to the fluid filter, the shell is configured to cover and seal with an area of fluid flow of the fluid filter;

an inlet configured to allow entry of fluid into the shell;

an outlet configured to allow exit of fluid from the shell; and a mount connected to the shell, the mount includes a sidewall and ribs, the mount defining a plurality of openings, the plurality of openings configured to allow the filter head to mount onto another piece of equipment, the sidewall extending from an outer wall structure of the shell, the ribs including upper ribs and lower ribs, the upper ribs directly connect to and extend between the plurality of openings, the plurality of openings and the ribs define an interior hollow region of the mount, wherein the plurality of openings and the upper ribs extend from a first end of the hollow region to a second end of the hollow region, the first end of the hollow region being enclosed by at least one of the sidewall of the mount and/or a portion of the outer wall structure of the shell, the inlet and the outlet extend away from the fluid filter in an opposite direction with respect to the ribs, wherein the ribs extend relative to the sidewall of the mount, wherein the outer wall structure of the shell fluidly separates the interior hollow region of the mount from an interior region of the shell, and wherein the shell, the mount, the inlet, and outlet are integrally molded from a composite material as a one-piece component.

25. The filter head of claim 1, wherein the ribs and the plurality of openings extend substantially perpendicularly relative to the sidewall of the mount in a first direction, wherein the inlet and the outlet extend from the shell in a second direction that is substantially perpendicular to the sidewall of the mount, and wherein the first direction of the ribs and the plurality of openings is in an opposite direction with respect to the second direction of the inlet and the outlet.

* * * * *